(12) United States Patent
Wigren

(10) Patent No.: US 9,313,742 B2
(45) Date of Patent: Apr. 12, 2016

(54) POWER CONTROL LOOP STABILITY MONITORING

(75) Inventor: Karl Torbjörn Wigren, Uppsala (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 617 days.

(21) Appl. No.: 13/314,759

(22) Filed: Dec. 8, 2011

(65) Prior Publication Data

US 2012/0147765 A1 Jun. 14, 2012

Related U.S. Application Data

(60) Provisional application No. 61/448,713, filed on Mar. 3, 2011, provisional application No. 61/421,754, filed on Dec. 10, 2010.

(51) Int. Cl.
| | |
|---|---|
| *H04W 52/24* | (2009.01) |
| *H04W 52/34* | (2009.01) |
| *H04W 52/14* | (2009.01) |
| *H04B 17/345* | (2015.01) |

(52) U.S. Cl.
CPC ........... *H04W 52/146* (2013.01); *H04B 17/345* (2015.01); *H04W 52/243* (2013.01); *H04W 52/343* (2013.01)

(58) Field of Classification Search
CPC ............ H04W 52/146; H04W 52/243; H04W 52/343; H04B 17/345
See application file for complete search history.

(56) References Cited

U.S. PATENT DOCUMENTS

| 8,243,860 B1* | 8/2012 | Lee ..................... H04L 25/0206 375/316 |
| 2007/0024502 A1* | 2/2007 | Goldberg .................. G01S 3/74 342/378 |
| 2007/0054619 A1 | 3/2007 | Kinnunen et al. |
| 2009/0088080 A1 | 4/2009 | Zhang et al. |
| 2009/0190485 A1* | 7/2009 | Bjorkegren ......... H04W 52/241 370/252 |
| 2009/0196162 A1* | 8/2009 | Sambhwani ......... H04B 1/7103 370/201 |

FOREIGN PATENT DOCUMENTS

| EP | 2647143 A1 | 10/2013 | |
| SE | WO 2006/076969 A1 * | 7/2006 | ............. H04B 17/00 |
| SE | WO 2008/097145 A1 * | 8/2008 | ............. H04B 17/00 |
| SE | WO 2008097145 A1 * | 8/2008 | .......... H04W 52/343 |
| WO | WO 2006/076969 A1 * | 7/2006 | ............. H04B 17/00 |
| WO | 2008039123 A1 | 4/2008 | |

(Continued)

OTHER PUBLICATIONS

Wigren et al (WO 2008/097145 Al published Aug. 14 2008) same as Document O.*

(Continued)

*Primary Examiner* — Andrew Lai
*Assistant Examiner* — Hoyet H Andrews
(74) *Attorney, Agent, or Firm* — Coats & Bennett, P.L.L.C.

(57) ABSTRACT

New load measures are provided for a base station in a wireless communication network using interference suppression receivers. The new load measures are based on the estimation of neighbor cell interference and reflect the load after interference suppression. The improved load measures are used to monitor the stability of the uplink power control loops of the user terminals served by the base station.

23 Claims, 7 Drawing Sheets

(56) References Cited

FOREIGN PATENT DOCUMENTS

| WO | WO 2008/097145 A1 * | 8/2008 | ............. H04B 17/00 |
| WO | 2012074475 A1 | 6/2012 | |

OTHER PUBLICATIONS

Wigren et al (WO 2006/076969 published Jul. 27 2006) same as Document N.*

Wigren et al ("Load Estimation Using Scheduled Uplink Power" WO 2008/097145 Al published Aug. 14, 2008) same as Document O.*

Wigren et al ("Methods and Devices for Uplink Load Estimation" WO 2006/076969 published Jul. 27, 2006) same as Document N.*

Wigren et al, Fall 2007 IEEE 66th Vehicular Technology Conference "Estimation of Uplink WCDMA Load in a Single RBS"; pp. 1499-1503, presented Sep. 30, 2007.*

Wang ("Adaptive Fingers Selection of Grake Receivers in MIMO-HSDPA"), Feb. 15 2008.*

Wigren et al ("Soft Uplink Load Estimation in WCDMA" IEEE Transactions on Vehicular Technology, vol. 58 No. 2. published Feb. 13 2009.*

Kutz et al (On the Performance of a Practical Downlink CDMA Generalized RAKE receiver, "2002 IEEE 56th Vehicular Technology Conference Proceedings vol. 4 of4", pp. 1352-1556, Sep. 24-28, 2002.*

Welch et al (An Introduction to the Kalman Filter published Jul. 24 2006 and retrieved from [https://www.cs.unc.edu/~welch/media/pdf/kalman_intro.pdf] on May 21, 2015).*

Wigren, T., "Soft Uplink Load Estimation in WCDMA," in Vehicular Technology, IEEE Transactions on , vol. 58, No. 2, pp. 760-772, Feb. 2009 doi: 10.1109/TVT.2008.926210.*

Wigren, T., "Soft Uplink Load Estimation in WCDMA", IEEE Transactions on Vehicular Technology, vol. 58, No. 2, Feb. 2009, pp. 760-772.

Wigren, T., "Recursive Noise Floor Estimation in WCDMA", IEEE Transactions on Vehicular Technology, vol. 59, No. 5, Jun. 2010, pp. 2615-2620.

QUALCOMM Europe, "UTRAN enhancements for the support of inter-cell interference cancellation", 3GPP TSG-RAN WG3 #59, Feb. 11-15, 2008, pp. 1-8, Sorrento, Italy.

Wigren, T., et al., "Estimation of uplink WCDMA load in a single RBS", IEEE Vehicular Technology Conference, VTC-2007, Fall. 2007 IEEE 66th, Sep. 30-Oct. 3, 2007, pp. 1499-1503.

Cairns, D. et al. "Experiemental Evaluation of Interference Cancellation for Dual-Antenna UMTS Handset." 2005 IEEE Vehicular Technology Conference, vol. 2, Sep. 25, 2005, pp. 877-881.

Ahmed, M.H. "Call admission Control in Wireless Networks: A Comprehensive Survey." IEEE Communications Surveys, IEEE, First Quarter 2005, vol. 7, No. 1, pp. 50-69 (uploaded as 2 separate documents).

* cited by examiner

POWER CONTROL LOOP STABILITY MONITORING

RELATED APPLICATIONS

This application claims the benefit of U.S. Provisional Patent Application Ser. No. 61/448,713 filed Mar. 3, 2011 and U.S. Provisional Patent Application Ser. No. 61/421,754 filed on Dec. 10, 2010.

TECHNICAL FIELD

The present invention relates generally to power control for user terminals in a wireless communication network, and more particularly to power control loop stability monitoring in a communication network implementing fast power control for the uplink.

BACKGROUND

In some types of wireless communication systems, such as Wideband Code Division Multiple Access (WCDMA) systems, interference suppression (IS) is used in order to achieve better performance in terms of peak data rates, coverage, system throughput, and system capacity. Examples of such interference suppression receivers that are commonly used include the GRAKE+ receiver, the Frequency Domain Equalization (FDE) receiver, and the Frequency Domain Pre-Equalization (FDPE) receiver.

The user terminals, also called user equipments (UEs), in WCDMA systems are subject to fast inner loop power control for uplink (UL) transmissions. The power control loops steer the powers of the user terminals so as to achieve desired signal-to-interference-plus-noise (SINR) targets for the user terminals. The power control loops for all user terminals are coupled nonlinearly through the SINR measurement (the so called "party effect"). It is known that the power control loops remain stable as long as the uplink is operated below its pole capacity. However, when the system is close to the pole capacity, stability is reduced and power rushes can occur. In a power rush, the user terminals increase their uplink transmission power, which causes additional interference. The base station tries to counteract the increase in interference by instructing the user terminals to further increase their transmit powers in order to meet the target SINR, which further increases the interference. Due to the positive feedback loop, the system may not be able to meet the target SINR and a power rush may cause a system outage.

Instability is a significant problem in WCDMA systems because the power control loops are very fast and capable of stepping up the transmission power of the user terminals at a rate of 1500 dBs/second. Mechanisms to prevent such power rushes are therefore necessary where the uplink in a WCDMA system is to be operated close to the pole capacity.

Stability monitoring based on estimates of the load as seen at the base station has been used in the past to prevent power rushes. Consecutive estimates of the load are determined at a rate at least as fast as the power control loop. Functions of the load estimate, such as the rate of change of the load and the absolute level of the load, are then compared to corresponding thresholds and a power rush is declared if the functions exceed the thresholds.

The stability monitoring techniques used in the past were not developed with interference suppression receivers in mind. Therefore, the load estimates used in conventional receivers will be higher than the effective load experienced by a base station using interference suppression receivers. Also, with interference suppression receivers, the power control loops are closed after interference suppression processing. Known techniques for measuring the load after interference suppression are either too computationally complex, or not suited for stability monitoring. For example, in U.S. Patent Application 61/419,447 filed Dec. 3, 2010, the rise over thermal (RoT) after interference suppression is used for fast congestion control (FCC) purposes. However, strictly speaking, the RoT is related to coverage and not cell stability. Finally, the load estimates for interference suppression receivers should account for neighbor cell interference. There are currently no efficient methods available for measuring the neighbor cell interference.

Additionally, interference suppression receivers are more sensitive to the overall interference on the uplink as compared to conventional receivers. Therefore, the power control loops for interference suppression receivers are more prone to power rushes than the power control loops of conventional receivers. Consequently, the need for stability monitoring will become increasingly important when interference suppression receivers are introduced in the uplink in WCDMA systems.

SUMMARY

The present invention relates to power control loop stability monitoring for use in wireless communication networks implementing fast power control in the uplink. Exemplary embodiments of the present invention are applicable to base stations using interference suppression receivers.

One aspect of the invention relates to the estimation of neighbor cell interference using cell load estimates and measurements of the total interference before interference suppression processing. The estimates of the neighbor cell interference enable more accurate load measures for stability monitoring.

Another aspect of the invention relates to the estimation of the load in terms of the noise rise after interference suppression that is relevant for stability monitoring. The noise rise measures account for neighbor cell interference.

Another aspect of the invention comprises the application of the noise rise after interference suppression to power control loop stability monitoring.

Exemplary embodiments of the invention comprise methods implemented in a base station of a wireless communication network for monitoring the stability of the power control loops controlling the transmit power of a user terminals on the uplink. In one exemplary method, signals are received from one or more user terminals, and interference in the received signals is suppressed with an interference suppression receiver to obtain reduced interference signals. Neighbor cell interference from neighboring cells is estimated, and a noise rise is computed for the user terminal as a function of the reduced interference signals and the estimate of the neighbor cell interference. Stability of the power control loop is then determined based on the noise rise estimates.

A corresponding base station in a cell of a wireless communication network includes an interference suppression receiver and a control circuit. The interference suppression receiver is configured to suppress interference in signals received at the base station from one or more user terminals to obtain a reduced interference signal. The control circuit controls the transmit power of the mobile terminal, and monitors the stability of the power control loops. The control circuit includes a neighbor cell interference estimation circuit to generate an estimate of interference from neighboring cells, a noise rise estimation circuit to compute a noise rise for the user terminal as a function of the reduced interference signals and the estimate of the neighbor cell interference, and a stability monitoring circuit to monitor a stability of a power control loop for the mobile terminal based on the noise rise.

Embodiments of the present invention enable the measurement of the load at the base station in terms of the noise rise after interference suppression. These new load measures are more relevant to stability monitoring where interference suppression references are employed at the base station. The new load measures provide a more accurate estimate of the effective load after interference suppression, so that the base station can operate closer to its pole capacity.

DETAILED DESCRIPTION

Figure 1:
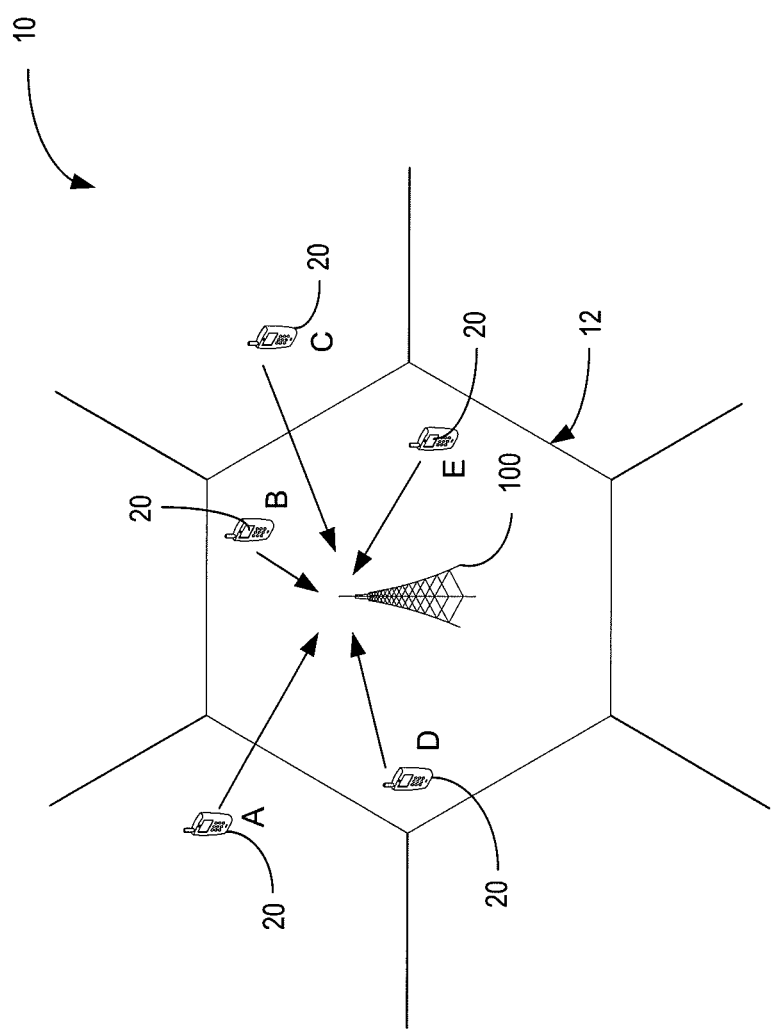
FIG. 1 illustrates an exemplary wireless communication network according to one exemplary embodiment including a base station implementing power control loop stability monitoring.

Referring now to the drawings, one embodiment of the present invention will be described in the context of a Wideband Code Division Multiple Access (WCDMA) system. Those skilled in the art will appreciate, however, that the present invention is more generally applicable to communication systems using fast power control to control the transmit powers of the user terminals transmitting on the uplink.

FIG. 1 illustrates a wireless communication network 10 including a base station 100 implementing power control loop stability monitoring according to embodiments of the present invention. The base station 100 provides service to a plurality of user terminals 20 within a cell 12 served by the base station 100. The base station 100 receives signals of interest on an uplink (UL) channel from user terminals 20 within the cell 12 served by the base station 20. In WCDMA systems, the base station 100 controls the transmit power of the user terminals 20 over the UL channel so that the received signal power from the user terminals 20 is approximately equal. The base station 100 also receives interfering signals from user terminals 20 in neighboring cells. The total load seen by the base station 20 is the sum of the load due to the user terminals 20 within the cell 12, and the load due to user terminals 20 in neighboring cells 12. When the load is high, the power control loops for the user terminals 100 within the cell 12 may become unstable and lead to a power rush. Accordingly, some mechanism is needed to monitor the stability of the power control loops and take corrective action before a power rush occurs.

Figure 2:
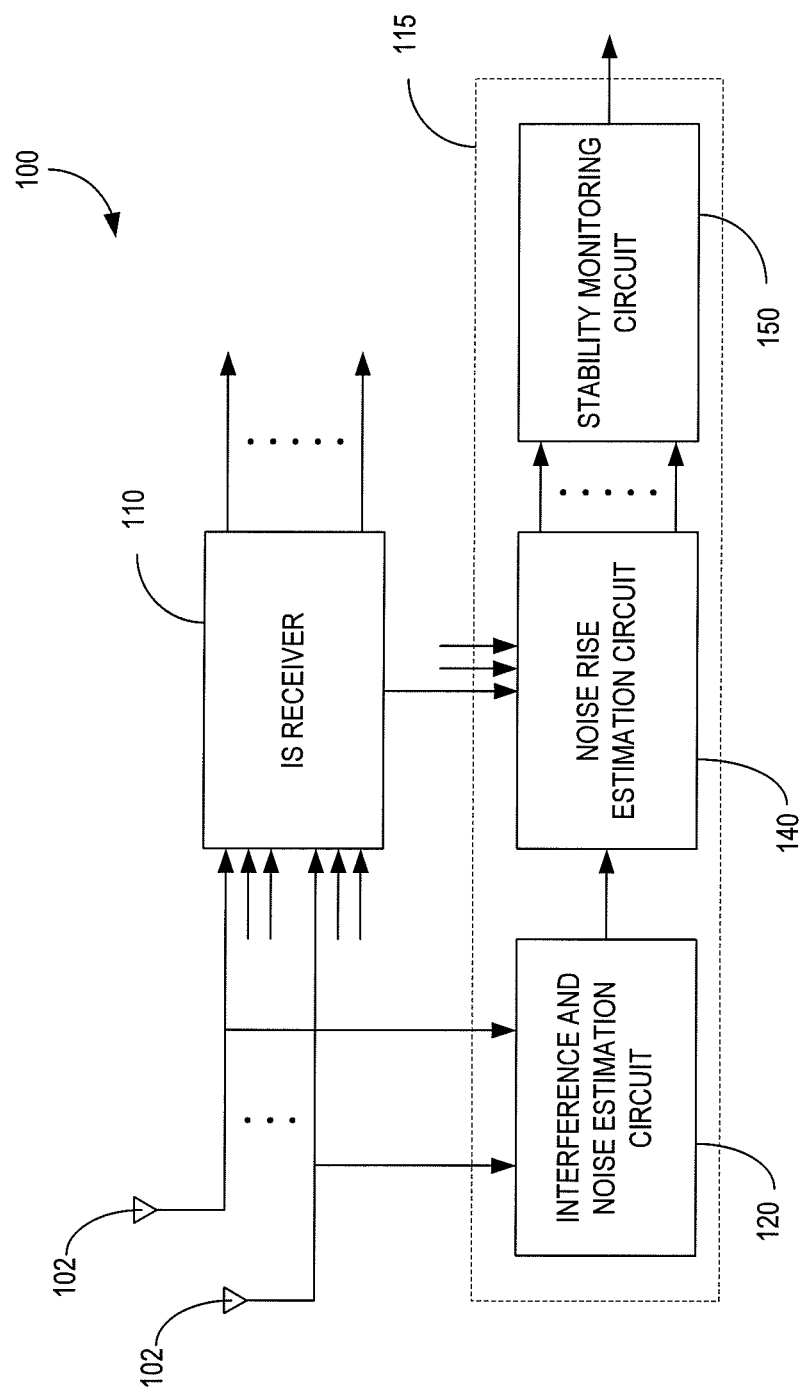
FIG. 2 illustrates the main functional elements of a base station in the wireless communication network implementing power control loop stability monitoring.

FIG. 2 illustrates the main functional components of an exemplary base station 100 according to one embodiment of the invention. The base station 100 comprises an interference suppression (IS) receiver 110 coupled to one or more antennas 102, and a control circuit 115. The control circuit 115 controls the transmit powers of the user terminals 20 transmitting on the uplink. The control circuit 115 includes an interference and noise estimation circuit 120 for estimating the thermal noise and neighbor cell interference, a noise rise estimation circuit 140, and a stability monitoring circuit 150. The signals received by the antennas 102 from the user terminals 20 are input to the interference suppression receiver 110 and interference and noise estimation circuit 120. The interference suppression receiver 110 demodulates the received signals and suppresses interference in the received signals. The demodulated signals with interference suppressed are output to a decoder (not shown). The interference and noise estimation circuit 120 processes the received signals to generate estimates of the noise floor and neighbor cell interference. These estimates are input to the noise rise estimation circuit 140.

The noise rise estimation circuit 140 receives statistics from the interference suppression receiver 110. The type of statistics will depend on the type of the interference suppression receiver 110. As will be hereinafter described in greater detail, the noise rise estimation circuit 140 determines an estimated noise rise for the uplink after interference suppression, which is used for power control loop stability monitoring. The noise rise estimates, denoted $NR^{IS}$, indicate the load at the base station 100 after accounting for the effects of interference suppression. The noise rise estimates $NR^{IS}$ generated by the noise rise estimation circuit 140 are input to the stability monitoring circuit 150.

The stability monitoring circuit 150 compares one or more functions of the noise rise estimates $NR^{IS}$ to corresponding thresholds and declares a power rush if the functions exceed the corresponding thresholds. If a power rush is declared, corrective actions to reduce the load may be taken. For example, the base station 100 may instruct one or more of the user terminals 20 to reduce their transmit powers in order to reduce the load. In one exemplary embodiment, the stability monitoring circuit 150 compares a rate of change of the noise rise estimate $NR^{IS}$ to a first threshold and the absolute value of the noise rise $NR^{IS}$ to a second value. A power rush is declared if either one of the evaluation functions, or both, exceed their respective thresholds.

Figure 3:
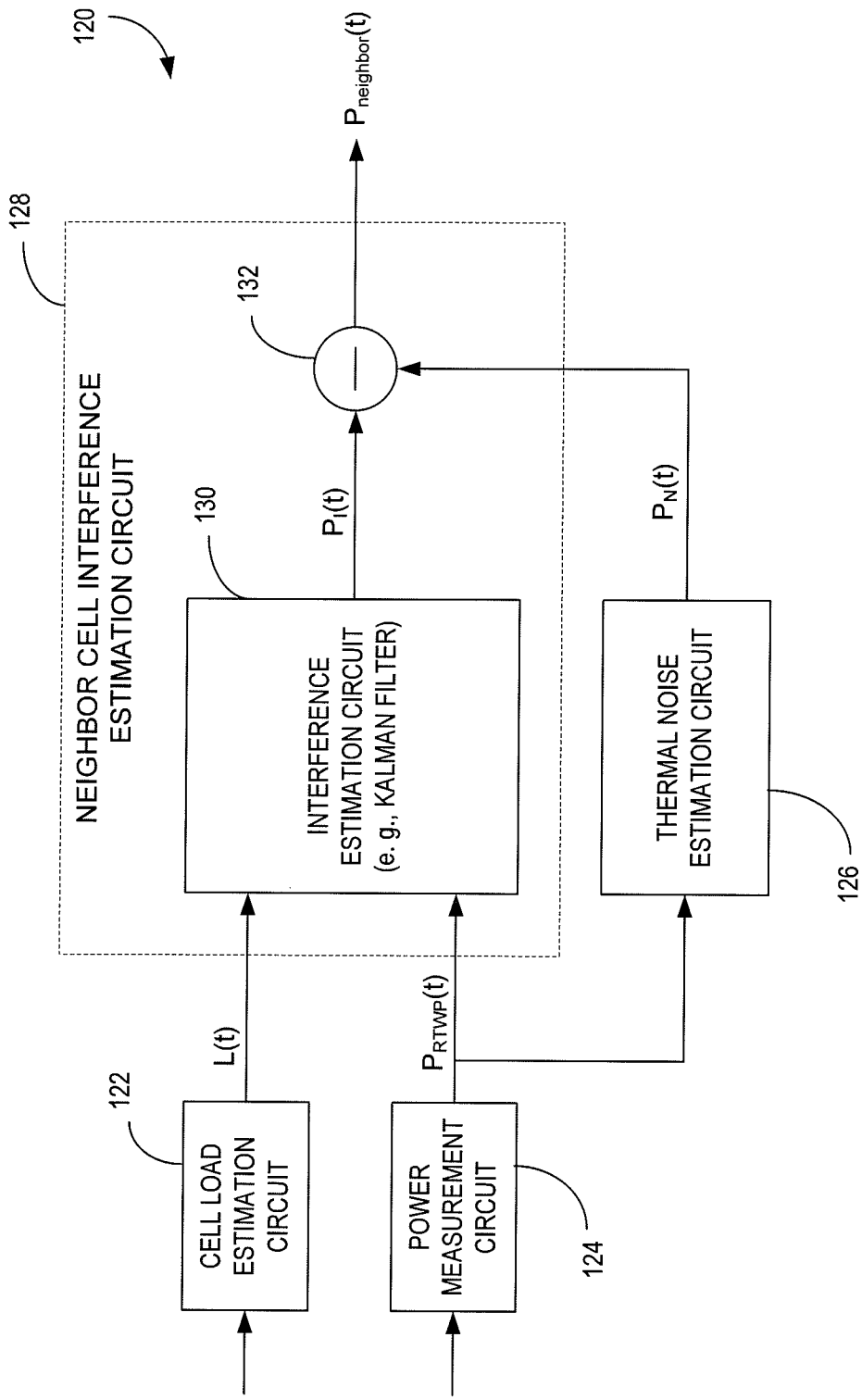
FIG. 3 illustrates an exemplary interference and noise estimation circuit in a base station implementing power control loop stability monitoring.

FIG. 3 illustrates an exemplary interference and noise estimation circuit 120 according to one embodiment. The interference and noise estimation circuit 120 comprises a cell load estimation circuit 122, a power measurement circuit 124, a thermal noise estimation circuit 126, and a neighbor cell interference estimation circuit 128. The cell load estimation circuit 122 generates an estimate of the cell load $L_{OWN}$ before interference suppression based on measurements of the received signal power and interference power. In one exemplary embodiment, the cell load before interference suppression is defined as:

$$L_{own} = \sum_{u=1}^{U} \frac{P_u}{P_{RTWP}} = \sum_{u=1}^{U} \frac{(C/I)_u}{1 + (C/I)_u}, \qquad (1)$$

where $P_u$ is the transmit power for the uth user terminal 20, $P_{RTWP}$ is the received total wideband power, and $(C/I)_u$ is the code power-to-interference ratio for the uth user terminal 20. The cell load $L_{OWN}$ computed by the cell load estimation circuit 122 is input to the interference estimation circuit 126.

Exemplary techniques for estimating the cell load are described in Wigren and P. Hellqvist, "Estimation of uplink WCDMA load in a single RBS", Proc. IEEE VTC-2007 Fall, Baltimore, Md., USA, Oct. 1-3, 2007, and T. Wigren, "Soft uplink load estimation in WCDMA", IEEE Trans Veh. Tech., March, 2009. These references are incorporated herein in their entirety by reference.

The power measurement circuit 124 measures the received total wideband power $P_{RTWP}(t)$. In one exemplary embodiment, the $P_{RTWP}(t)$ is defined as:

$$P_{RTWP}(t) = \sum_{u=1}^{U} P_u(t) + P_{neighbor}(t) + P_N(t), \quad (2)$$

where $P_u(t)$ is the transmit power of the uth user terminal 20, $P_{neighbor}(t)$ is the interference power from neighboring cells, and $P_N(t)$ is the thermal noise power. The $P_{RTWP}(t)$ is a measured value and can be measured at the antenna connector using well known techniques The measured $P_{RTWP}$ is input to the interference estimation circuit 126 and the thermal noise estimation circuit 132.

The thermal noise estimation circuit 132 generates an estimate of the thermal noise power $P_N(t)$ before interference suppression based on the measured $P_{RTWP}(t)$. The thermal noise power estimate $P_N(t)$ may be measured at the antenna connector using well known techniques. Exemplary techniques for estimating the thermal noise are described in T. Wigren, "Recursive noise floor estimation in WCDMA", IEEE Trans. Veh. Tech., vol. 59, no. 5, pp. 2615-2620, 2010, which is incorporated herein in its entirety by reference. The thermal noise power estimate $P_N(t)$ is input to the summing circuit 128.

The neighbor cell interference estimation circuit 128 includes an interference estimation circuit 130 and a summing circuit 132. The interference estimation circuit 130 uses the cell load $L_{OWN}$ and received total wideband power $P_{RTWP}(t)$ to estimate the total interference power in the received signal due to neighbor cell interference and the thermal noise. The total interference power is denoted $P_I(t)$. The estimate of the total interference power $P_I(t)$ is input to the summing circuit 132. The summing circuit 132 subtracts the estimate of the thermal noise power $P_N(t)$ from the total interference power $P_I(t)$ due to neighbor cell interference and thermal noise to obtain an estimate of the neighbor cell interference power $P_{neighbor}(t)$ before interference suppression. As will be described in more detail below, one aspect of the invention comprises new techniques for estimating the total interference power.

The estimation of neighbor cell interference power $P_{neighbor}(t)$ enables new load measures for interference suppression receivers 110 that reflect the load after interference suppression that is relevant for stability monitoring. As noted above, the new load measure in one embodiment comprises the noise rise after interference suppression, denoted $NR^{IS}$. The improved load measures based on the estimation of neighbor cell interference are then used by the stability monitoring circuit 140 to monitor the stability of the uplink power control loops of the user terminals 20. The improved load measures based on the estimation of neighbor cell interference can be applied by the stability monitoring circuit 140 to perform stability monitoring, by comparing the load measures to stability related load thresholds, set after interference suppression processing gains.

In one exemplary embodiment, the interference estimation circuit 130 comprises a Kalman filter configured to accurately estimate the total interference power $P_I(t)$ as the sum of neighbor cell interference power and thermal noise power. More particularly, the Kalman filter is configured so that the internally estimated state $\hat{x}(t)$ of the Kalman filter is the sum of neighbor cell interference power and thermal noise power. That is, the internal state $\hat{x}(t)$ of the Kalman filter equals the total interference power $P_I(t)$. The Kalman filter performs a joint estimation of the received total wideband power $P_{RTWP}(t)$ and the total interference power $P_I(t)=P_{neighbor}(t)+P_N(t)$.

The modified Kalman filter performs the joint estimation using measurements of $P_{RTWP}(t)$ and the computed cell load. The total wideband interference power $P_{RTWP}(t)$ is determined at a sampling rate of $T_{RTWP}(t)=k_{RTWP}TTI$ for $k_{RTWP} \in Z+$, where $Z+$ represents a set of positive integers. The computed load is determined at a sampling rate of $T_L(t)=k_L TTI$ for $k_L \in Z+$. The interference estimation circuit 130 selects the state $x_1(t)$ as:

$$x_1(t) = P_{neighbor}(t) + P_N(t) = (t) \quad (3)$$

The measured signal available for processing is $P_{RTWP}(t)$, which is determined by the power measurement circuit 124. The $L_{own}(t)$ is a computed quantity, e.g., based on signal-to-noise ratio measurements, which is determined by the load estimation circuit 122. The cell load $L_{own}(t)$ may be computed according to Equation (1). In one embodiment, the code power-to-interference estimate may be computed according to:

$$(C/I)_u(t) = \frac{SINR_u(t)}{W_u} \frac{RxLoss}{G} \times \left(1 + \frac{\beta_{DPDCH,u}^2(t) + \beta_{EDPCCH,u}^2(t) + n_{codes,u}(t)\beta_{EDPDCH,u}^2(t) + \beta_{HSDPCCH,u}^2(t)}{\beta_{DPCCH}^2(t)}\right) \quad (4)$$

In Equation (4), $W_u$ represents the spreading factor for user u, RxLoss represents missed receiver energy, G represents the diversity gain, and the $\beta$'s represent the beta factors of the respective channels (assuming non-active channels have zero beta factors). The beta factors determine the power overhead of the data channel with respect to the control channel.

A model of the total interference power $P_{RTWP}(t)$ may then be generated in terms of the states, computed quantities, and a measurement uncertainty. To that end, Equation (1) is used together with a delay $T_D$ that models the scheduling loop delay of WCDMA to compute $P_{RTWP}(t)$ according to:

$$P_{RTWP}(t) = L_{own}(t-T)P_{RTWP}(t) + P_{neighbor}(t) + P_N(t), (5) \quad (5)$$

which results in:

$$P_{RTWP}(t) = \frac{1}{1 - L_{own}(t-T_D)}(P_{neighbor}(t) + P_N(t)). \quad (6)$$

After the addition of a zero-mean white measurement noise $e_{RTWP}(t)$ and replacement of variables by Equation (3), the following time variable measurement equation results:

$$y_{RTWP}(t) = \frac{x_1(t)}{1 - L_{own}(t-T_D)} + e_{RTWP}(t) \quad (7)$$

$$R_{2,RTWP}(t) = E|e_{RTWP}^2(t)|. \quad (8)$$

Here, $y_{RTWP}(t)=P_{RTWP}(t)$ and $P_{2,RTWP}(t)$ represents the scalar covariance matrix of $e_{RTWP}(t)$. Note: $L_{own}(t)$ is computed using both enhanced uplink and R99 traffic, and therefore, the delay is valid for both.

To set up the optimal filtering algorithm, it is necessary to generate a model for propagation of the state. This may be solved by postulating a random walk model as given by Equation (9), which is a standard statistical model often used in Kalman filtering.

$$x(t+T_{TTI}) \equiv x_1(t+T_m) = x_1(t) + w_1(t) \quad (9)$$

$$R_1(t) = E[w_1(t)]^2 \quad (10)$$

In Equation (9), $R_1(t)$ represents the covariance matrix of the zero mean white disturbance. The state space model behind the Kalman filter is:

$$x(t+T) = A(t)x(t) + B(t)u(t) + w(t) \quad (11)$$

$$y(t) = C(t)x(t) + e(t) \quad (12)$$

The variable $x(t)$ in Equations (11) and (12) represents the state vector, $u(t)$ represents an input vector, $y(t)$ represents an output measurement vector comprising the power measurements performed by the cell, e.g., the received total wideband power $P_{RTWP}(t)$, $w(t)$ represents the so-called systems noise that represents the modeled error, and $e(t)$ represents the measurement error. The matrix $A(t)$ represents the system matrix describing the dynamic modes, the matrix $B(t)$ represents the input gain matrix, and the vector $C(t)$ represents the measurement vector, which may be time varying. Finally, t represents the time and T represents the sampling period.

The general case with a time varying measurement vector is considered here. The Kalman filter is then given by the following matrix and vector iterations after the initialization, where the initialization is given by $t=t_0$, $\hat{x}(0|-1)=x_0$, and $P(0|-1)=P_0$.

$$t = t+T$$

$$K_f(t) = P(t|t-T)C^T(t)(C(t)P(t|t-T)C^T(t) + R_2(t))^{-1}$$

$$\hat{x}(t|t) = \hat{x}(t|t-T) + K_f(t)(y(t) - C(t)\hat{x}(t|t-T))$$

$$P(t|t) = P(t|t-T) - K_f(t)C(t)P(t|t-T)$$

$$\hat{x}(t+T|t) = A\hat{x}(t|t) + Bu(t)$$

$$P(t+T|t) = AP(t|t)A^T + R_1(t)$$

End  (13)

where $\hat{x}(t|t-T)$ represents the state prediction based on data up to time $t-T$, $\hat{x}(t|t)$ represents the filter update based on data up to time $t$, $P(t|t-T)$ represents the covariance matrix of the state prediction based on data up to time $t-T$, $P(t|t)$ represents the covariance matrix of the filter update based on data up to time $t$, $C(t)$ represents the measurement matrix, $K_f(t)$ represents the time variable Kalman gain matrix, $R_2(t)$ represents the measurement covariance matrix, and $R_1(t)$ represents the system noise covariance matrix. It will be appreciated that $R_1(t)$ and $R_2(t)$ are often used as tuning variables for the filter. In principle, the bandwidth of the Kalman filter is controlled by the matrix quotient of $R_1(t)$ and $R_2(t)$.

The quantities of the Kalman filter for estimation of the sum of neighbor cell interference and noise power can now be defined. Using the state and measurement equations it follows that:

$$C(t) = \frac{1}{1 - L_{own}(t - T_D)} \quad (14)$$

$$R_2(t) = R_{2,RTWP}(t) = E[e_{RTWP}^2(t)] \quad (15)$$

$$A = 1 \quad (16)$$

$$B = 0 \quad (17)$$

$$R_1(t) = E[w_1(t)]^2. \quad (18)$$

The final processing step is provided by the algorithms for noise power floor estimation, which operate on the Gaussian distribution of the state $\hat{x}_1(t)$. Representing the estimated noise floor by $\hat{P}_N(t)$, it follows that the estimated neighbor cell interference becomes:

$$\hat{I}_{neighbor}(t) \equiv \hat{P}_{neighbor}(t) = \hat{x}(t) - \hat{P}_N(t) \quad (19)$$

The estimate of the neighbor cell interference obtained in Equation (19) is used to compute an enhanced load measure that is relevant for stability monitoring and reflects the reduction in the load due to interference suppression. More particularly, the estimated neighbor cell interference $\hat{I}_{neighbor}(t)$ is used to compute the noise rise estimate $NR^{IS}$, which is used by the stability monitoring circuit 140 to monitor the stability of the power control loops for the uplink connections.

Figure 4:
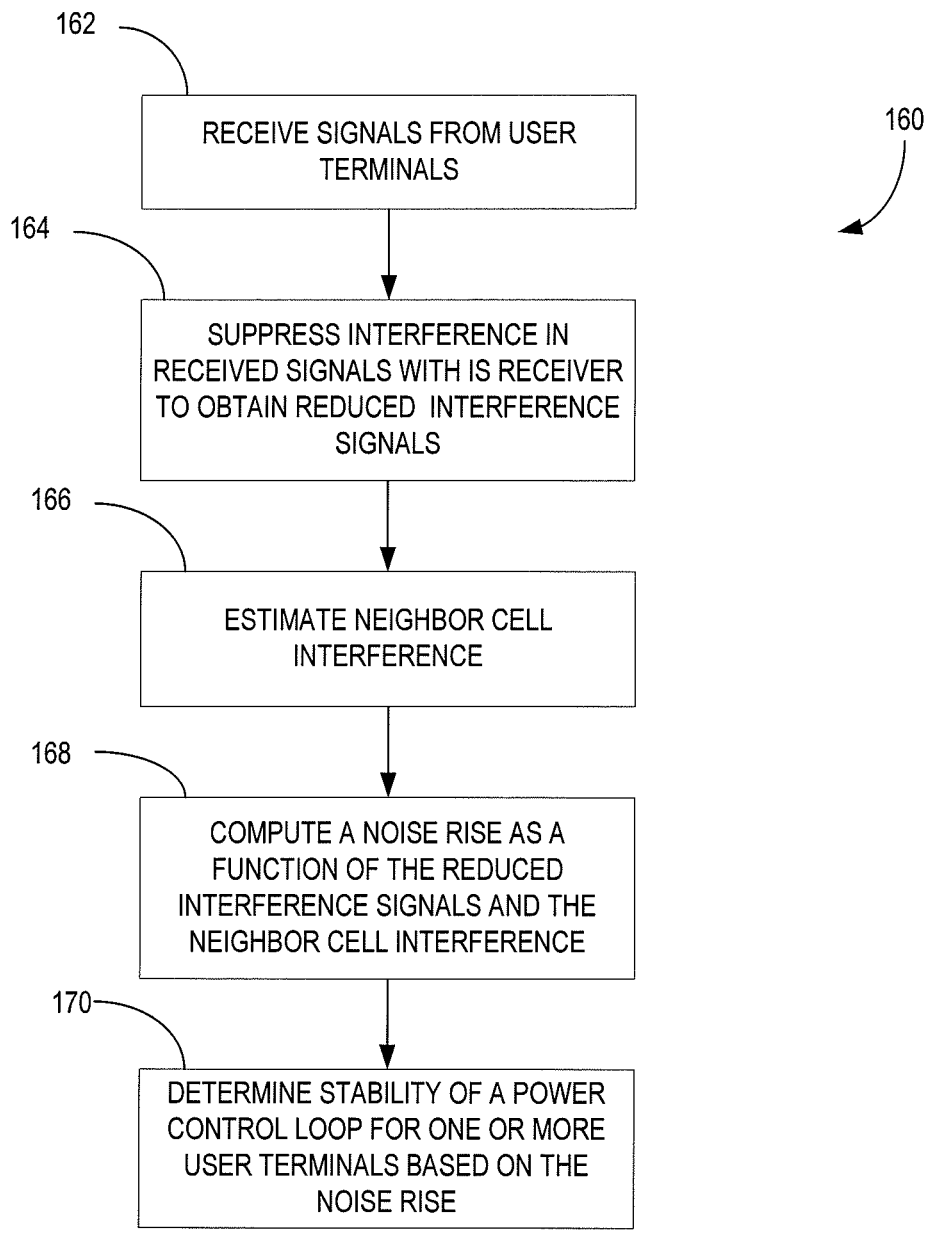
FIG. 4 illustrates an exemplary method of stability monitoring according to one embodiment of the invention.

FIG. 4 illustrates an exemplary stability monitoring method 160 according to one embodiment. The base station 100 receives signals from one or more user terminals 20 (block 162). The received signals are input to an interference suppression receiver 110. The interference suppression receiver 110 suppresses interference in the received signal to obtain reduced interference signals (block 164). An estimate of the neighbor cell interference is estimated by the neighbor cell interference estimation circuit 128 (block 166). A noise rise is then computed by the noise rise estimation circuit 140 as a function of the neighbor cell interference and the reduced interference signals (block 168). The noise rise estimate is provided to the stability monitoring circuit 150. As previously described the stability monitoring circuit 150 uses the noise rise estimates to determine the stability of the power control loop for one or more user terminals 20 (block 170).

The methods for computing the noise rise $NR^{IS}$ will depend on the type of the interference suppression receiver 110. In the following discussion, embodiments of the inventions using a GRAKE+ receiver, a Frequency Domain Equalization (FDE) receiver, or a Frequency Domain Pre-Equalization (FDPE) receiver. Some embodiments of the invention may use other types of interference suppression receivers 110. Therefore, the discussion herein of specific types of interference suppression receivers should not be construed as limiting.

Figure 5:
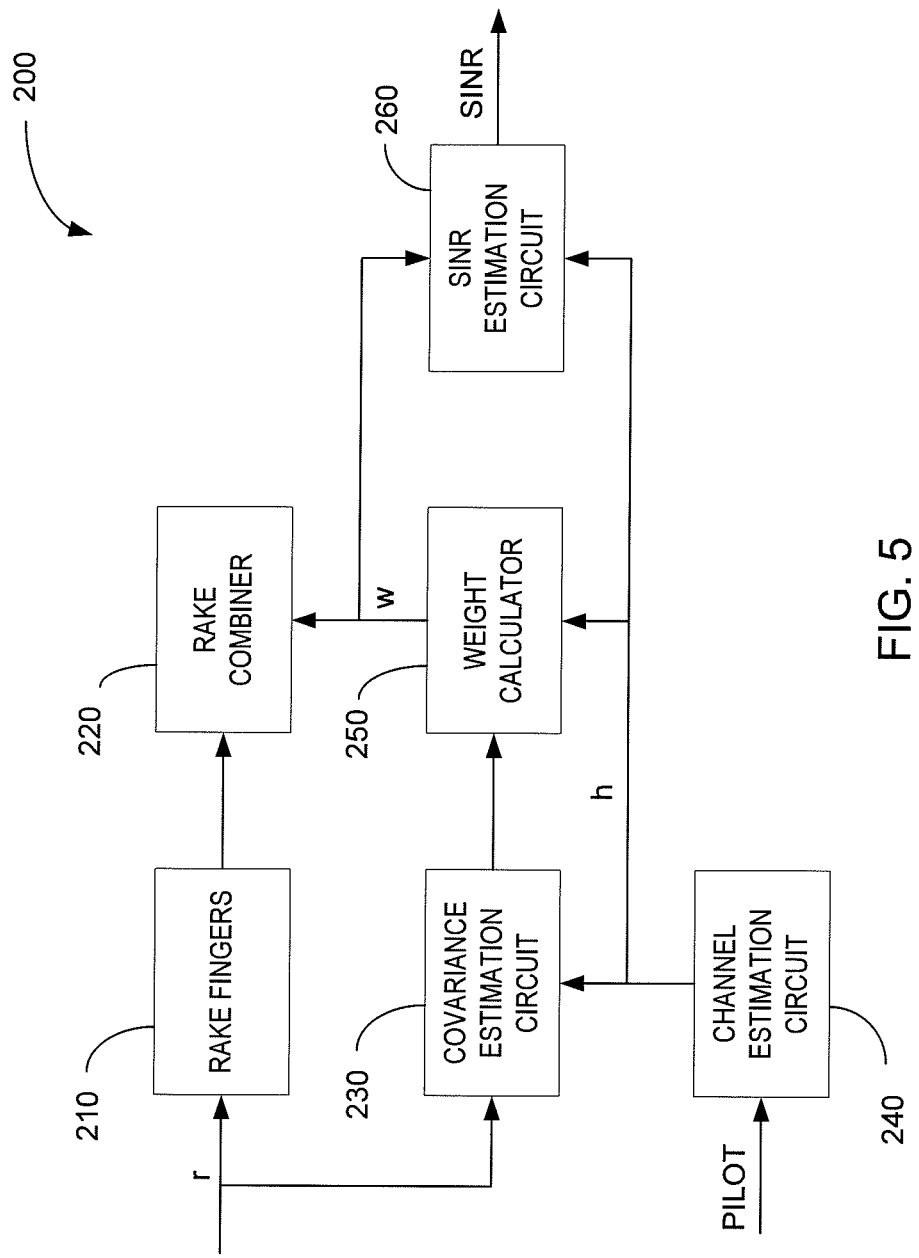
FIG. 5 illustrates an exemplary GRAKE+ receiver used in one embodiment.

FIG. 5 illustrates the main functional components of a GRAKE+ receiver 200 which may be used as an interference suppression receiver 110 in embodiments of the present invention. The GRAKE+ receiver 200 is a type of linear receiver. The GRAKE+ receiver 200 comprises a plurality of RAKE fingers 210 to despread the received signals and a GRAKE+ combiner 220 to coherently combine the outputs to form symbol estimates. In a conventional RAKE receiver, the object is to collect signal energy by placing fingers on the strongest path delays and combining the despread values from different fingers coherently using weights that correspond to estimates of the channel coefficient. In the case of a GRAKE+ receiver, finger placement and combining weight computation are used to both collect signal energy and suppress interference.

A covariance estimation circuit 230 estimates the correlations between impairment on different fingers of the GRAKE+ receiver 200 and generates an impairment covariance matrix $\hat{R}_u$.
where $\hat{h}_u$, u=1, ..., U, is the net channel response of user u, and where $\hat{w}_u$ are the combining weights. A channel estimation circuit 240 generates the estimate $\hat{h}_u$ of the channel coefficients based on a pilot signal. The impairment covariance matrix $\hat{R}$ and channel estimates $\hat{h}_u$ are input to a weight calculator 250. The weight calculator 250 determines the combining weights $\hat{w}_u$ for the RAKE combiner 210 according to:

$$\hat{w} = \hat{R}^{-1}\hat{h} \quad (20)$$

The channel estimates $\hat{h}_u$ and combining weights $\hat{w}_u$ are also input to an SINR estimation circuit 260. The SINR estimation circuit 260 computes an estimate of the SINR according to:

$$SINR_u^{IS} = \frac{(\hat{w}_u^H \hat{h}_u)^2}{\hat{w}_u^H \hat{R}_u \hat{w}_u}. \quad (21)$$

The effect of the covariance matrix $\hat{R}_u$ is to effectively whiten the correlated interference and remove large spectral peaks from interferers at certain finger locations and for certain antenna elements.

A chip equalizer receiver is a related type of interference suppression receiver for WCDMA, which is also linear. The difference between GRAKE+ receiver 200 and the chip equalizer receiver is the order of certain basic operations. Thus, some embodiments of the present invention may use a chip equalizer receiver.

In the case of the GRAKE+ receiver 200, the effective interference experienced by each user terminal 20 after interference suppression is individual. Therefore, an individual noise rise $N_u^{IS}$ is computed for each user terminal 20 according to:

$$NR_u^{G+} = \frac{S_u^{G+}}{\kappa_u^{G+}\hat{N}}\left(1 + \frac{SF_{u,EDPCCH}}{\beta_{u,effective}^2}\frac{1}{SINR_u^{G+}}\right) - \frac{\hat{I}_{neighbor}}{\hat{N}}, \quad (22)$$

$$u = 1, \ldots, U$$

The quantities appearing in Equation (22) are all defined in Annexes A and B. It should be noted that all estimates are obtained at the power control slot rate, i.e. 1500 Hz. This makes the estimates useful for stability monitoring of the inner power control loop in WCDMA. The $NR^{IS}$ relevant for stability monitoring is the maximum of the individual noise rise estimates $N_u^{IS}$. The noise rise relevant for stability monitoring is given by:

$$NR^{IS} = \max(NR_u^{G+}) \quad (23)$$

The noise rise given by Equation (23) is used by the stability monitoring circuit 150 to monitor the stability of the uplink power control loops. As previously described, the rate of change of the noise rise estimate, and/or the absolute value of the noise rise estimate may be compared to corresponding thresholds. A power rush is declared when either one, or both, of the monitoring criterion exceed their respective threshold.

Figure 6:
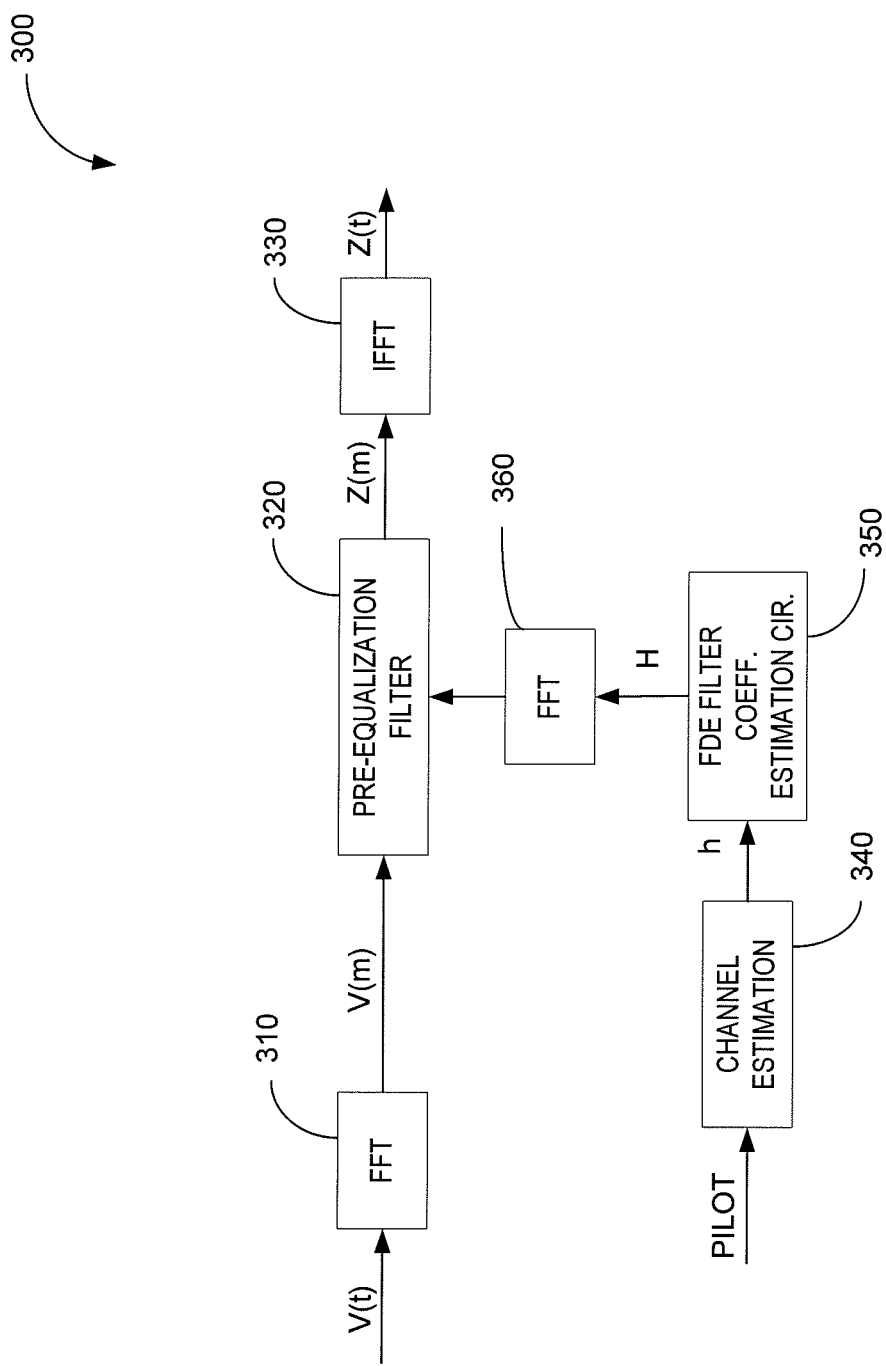
FIG. 6 illustrates an exemplary Frequency Domain Equalization receiver used in one embodiment.

FIG. 6 illustrates a frequency domain equalization (FDE) receiver 300, which may be used as an interference suppression receiver 110 in some embodiments. The FDE receiver 300 performs equalization and interference suppression in the frequency domain. To explain the operation of the FDE receiver 300, the following time domain signal model can be used.

$$v_u(t) = \sum_{l=0}^{L-1} h_u(l)z(t-l) + i(t) + n(t), \ldots u = 1, \ldots, U \quad (24)$$

where u denotes the user, $v_u$ is the received signal vector (vector due to multiple antennas), $h_u$ is the radio channel net response, z is the desired (transmitted) signal, i(t) is the interference, and n(t) denotes thermal noise.

The received signal is input to a Fast Fourier Transform (FFT) circuit 310. The FFT circuit 310 converts the received signal from the time domain to the frequency domain. The frequency domain signal is given by:

$$V_u(m) = H_u(m)Z_u(m) + I(m) + N(m), \ldots u=1,\ldots,U \quad (25)$$

where the quantities are the discrete Fourier transforms of the corresponding quantities in Equation (23).

In the FDE receiver 300, MMSE equalization is performed on $V_u(m)$ in the frequency domain by the frequency domain equalizer circuit 320. The frequency domain signal $V_u(m)$ is applied to the frequency domain equalizer circuit 320. The frequency domain equalizer circuit 320 multiplies the vector of the received signal $V_u(m)$ by a filter coefficient matrix $W_u(m)$ to obtain an estimate $Z_u$ of the desired (transmitted signal). The desired signal $Z_u$ is given by:

$$Z_{FDE,m}(m) = W_u(m)V_u(m) \quad (26)$$

The equalized signal $Z_u$ is then input to an Inverse Fast Fourier Transform (IFFT) circuit 330. The IFFT circuit 330 transforms the desired signal $Z_u$ from the frequency domain to the time domain to obtain a time domain estimate z(t).

For the purpose of computing the filter coefficient matrix, the channel is estimated in the time domain by a channel estimation circuit 340 using the pilot signal as illustrated in FIG. 6. In one embodiment, the MMSE filter coefficients may be computed in the time domain by a filter coefficient estimation circuit 350 and transformed to the frequency domain by the FFT circuit 360. Methods of computing the MMSE filter coefficients in the time domain are described in [4]. Rather than computing the filter coefficients in the time domain and then transforming them to the frequency domain, the MMSE filter coefficients can be directly according to:

$$W_u(m) = H_u^H(m)(H_u(m)H_u^H(m) + I(m)I^H(m) + (N(m))^H N(m))^{-1}, \ldots u=1,\ldots,U \quad (27)$$

The computation of the MMSE filter coefficients in the frequency domain is less computationally complex that the equivalent computations in the time domain.

In the case of the FDE receiver 200, the time domain estimate of the desired signal is used to compute the noise rise $NR_u$ for each user terminal 20. For the FDE receiver 200, the noise rise for individual user terminals 20 is given by:

$$NR_u^{FDE} = \frac{z_{FDE,u}^H(t)z_{FDE,u}(t)}{\left(\sum_{l=0}^{L-1} w_u^H(l)w_u(l)\right)\left(\sum_{a=1}^{A} \hat{N}_a^{thermal}\right)} - \frac{\hat{I}^{neighbor}(t)}{\left(\sum_{a=1}^{A} \hat{N}_a^{thermal}\right)} \quad (28)$$

The quantities in Equation (28) are defined in Annexes E and F. These quantities are estimated at the power control slot rate, e.g. 1500 Hz. The noise rise after interference suppression that is relevant for stability monitoring is the maximum noise rise for any user terminal 20 and is given by:

$$NR^{IS} = \max(NR_u^{FDE}) \quad (29)$$

Figure 7:
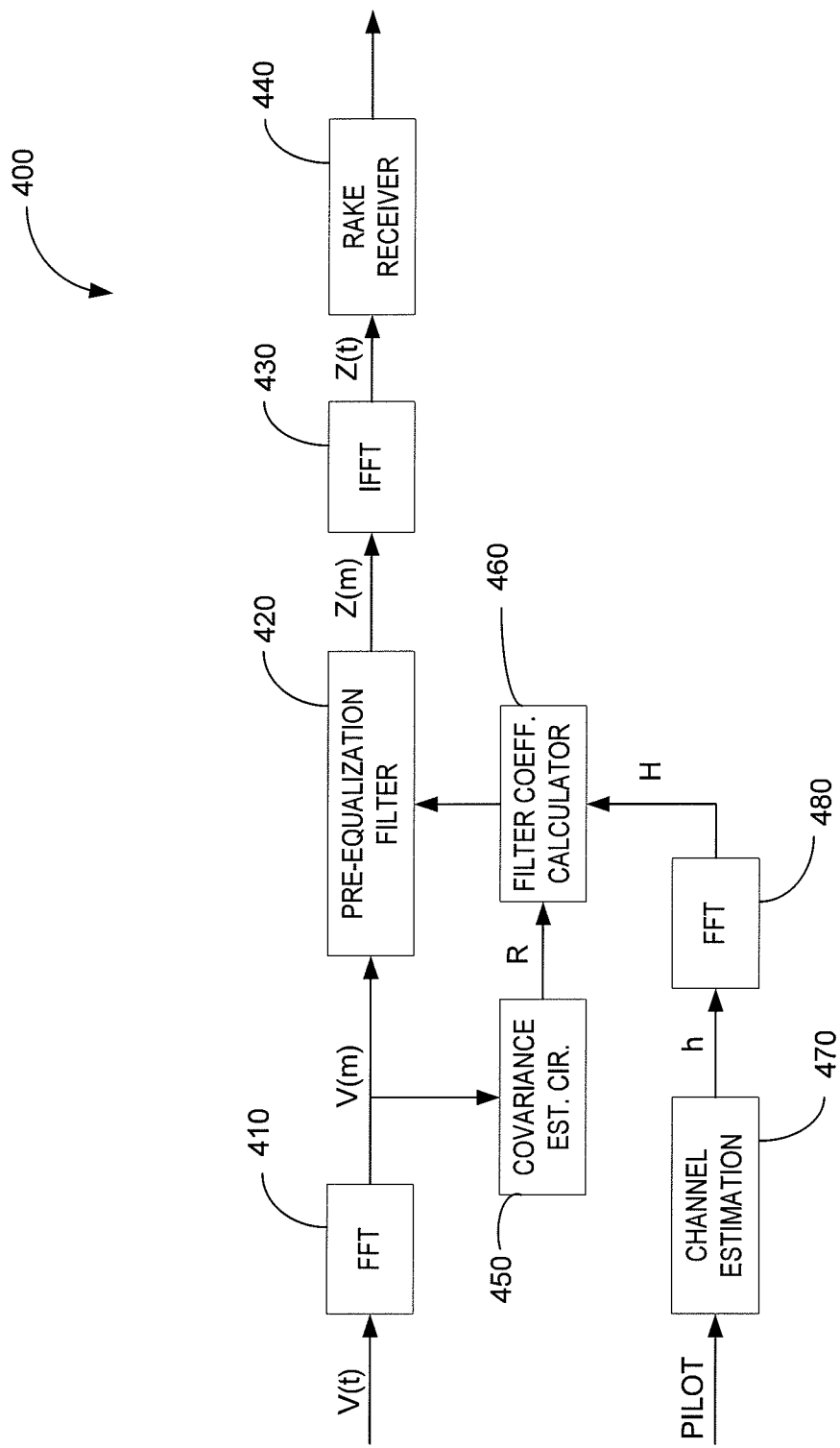
FIG. 7 illustrates an exemplary Frequency Domain Pre-Equalization receiver used in one embodiment.

FIG. 7 illustrates an exemplary FDPE receiver 400, which may be used as an interference suppression receiver 110 in some embodiments. The FDPE receiver 400 performs interference whitening in the frequency domain. The time domain signal can be modeled as:

$$v(t) = \sum_{l=0}^{L} h(l)z(t-l) + n_v(t) \quad (30)$$

where v is the received signal vector at chip sampling rate, h is the net channel response, z is the transmitted signal, and $n_v$ is the thermal noise and interference. The received signal vector v is input to a Fast Fourier Transform (FFT) circuit 410. The FFT circuit 410 translates the received signal vector into the frequency domain. The received signal vector in the frequency domain is modeled as:

$$V(m) = H(m)Z(m) + N(m) \quad (31)$$

The terms in Equation (31) are the discrete Fourier transforms of the corresponding terms in Equation (30). A pre-equalization filter 420 whitens the received signal vector V(m) in the frequency domain. The desired signal in the frequency domain, denoted $Z_{pre}(m)$, is given by:

$$Z_{pre}(m) = W_{pre}(m)V(m) \quad (32)$$

where $W_{pre}(M)$ is a matrix of the pre-equalization filter coefficients. The pre-qualized signal $Z_{pre}(m)$ is then transformed by the Inverse Fast Fourier Transform (IFFT) 430 to the time domain. The estimate of the transmitted signal in the time domain is denoted $z_{pre}(t)$. The time domain signal is input to a conventional RAKE receiver 440.

In one exemplary embodiment, the equalization filter 420 comprises a MMSE filter given by:

$$W_{pre}(M) = (r_D(M))^{-1}\hat{H}(m) = \left( \begin{bmatrix} R_{0,0}(m) & R_{0,1}(m) & \cdots & R_{0,N_r-1}(m) \\ R_{1,0}(m) & R_{1,1}(m) & & \\ \vdots & & \ddots & \\ R_{N_r-1,0}(m) & & & R_{N_r-1,N_r-1}(m) \end{bmatrix} \right)^{-1} \begin{bmatrix} \hat{H}_0(m) \\ \hat{H}_1(m) \\ \vdots \\ \hat{H}_{N_r-1}(m) \end{bmatrix} \quad (33)$$

where $\hat{R}_d(m)$ is an estimate of the covariance matrix of V(m). A covariance estimation circuit 450 computes the covariance matrix $\hat{R}_d(m)$. In one exemplary embodiment, the covariance matrix is computed according to Equation (34) below, averaged over N different data blocks.

$$\hat{R}_d(m) = \frac{1}{N}\sum_{k=0}^{N-1} V_k(m)V_k^H(m) \quad (34)$$

Using Cholesky decomposition, the covariance matrix between the antenna elements can be factored as:

$$L(m) \cdot L^H(m) = R_d(m) \quad (35)$$

The idea behind FDPE is to exploit the factorization and model the filter weights as:

$$W_{MMSE}(m) = (L^H(m))^{-1}((L(m))^{-1}\hat{H}(m)) = W_{pre}(m)((L(m))^{-1}\hat{H}(m))) \quad (36)$$

so that the transmitted signal in the frequency domain becomes MMSE pre-equalized in the frequency domain.

For the purpose of computing the filter coefficient matrix $\hat{R}_d(m)$, the channel is estimated in the time domain by a channel estimation circuit 470 using the pilot signal as illustrated in FIG. 7. The time domain channel estimates are then transformed to the frequency domain by the FFT 480. The frequency domain channel estimates and the covariance matrix $\hat{R}_d(m)$ provided by the covariance estimation circuit 470 are input to a filter coefficient calculator 460, which computes the filter coefficients for the pre-equalization filter 420.

Where a FDPE receiver 400 is used as the interference suppression receiver 110, the load relevant for stability monitoring is the noise rise after interference suppression is taken into account. The noise rise after interference suppression for all users is the same and is given by:

$$NR^{FDPE} = \frac{z_{pre}^H(t)z_{pre}(t)}{\left(\sum_{l=0}^{L-1} w_{pre}^H(l)w_{pre}(l)\right)\left(\sum_{a=1}^{A}\hat{N}_a^{thermal}\right)} - \frac{\hat{I}^{neighbor}(t)}{\left(\sum_{a=1}^{A}\hat{N}_a^{thermal}\right)} \quad (37)$$

The quantities in Equation (37) are explained in Appendices C and D. The quantities in Equation (37) are estimated at the power control slot rate. The noise rise after interference suppression that is relevant for stability monitoring is given by:

$$NR^{IS} = NR^{FDPE} \quad (38)$$

Various techniques have been described for computing the noise rise for different types of interference suppression receivers 110. The stability monitoring circuit 150, as previously noted, uses the noise rise measures as herein described to monitor the stability of the power control loops. In one exemplary embodiment, the stability monitoring circuit 150 computes a vector test quantity $$T(t) = f(NR^{IS}(t), \ldots, NR^{IS}(t-kT)) \quad (39)$$

where $NR^{IS}$ is any of the quantities given by Equations (23), (29) or (38), and $f(\ )$ is a function of this quantity. Typical embodiments of $f(\ )$ include the absolute load level $f_{level}$ and the rate of change of the load $f_{rate}$, given by $$f_{level}(NR^{IS}(t)) = NR^{IS}(t) \quad (40)$$

$$f_{rate}(NR^{IS}(t), NR^{IS}(t-T)) = \frac{NR^{IS}(t) - NR^{IS}(t-T)}{T} \quad (41)$$

The stability monitoring circuit 150 then compares one or both of the selected quantities to corresponding thresholds and may declare a power rush in case the selected threshold is exceeded. In case of a power rush, the stability monitoring circuit 150 may interrupt a power control loop to prevent a power rush. Additionally, the stability monitoring circuit 150 may take appropriate action taken to reduce uplink load and restore stability. For example, the stability monitoring circuit 150 could cause power down commands to be sent to one or more user terminals 20 to reduce uplink load.

In some embodiments, the stability monitoring circuit 150 may use a variety of sources of information for monitoring the stability of the power control loops. For convenience, the "other" sources of information are collected in a vector α. In general the stability monitoring algorithm hence computes a vector test quantity $$T_{FCC}(t) = f(g(NR^{IS}(t), \ldots, NR^{IS}(t-kT)), \alpha) \quad (42)$$

where $NR^{IS}$ is any of the quantities given by Equations (23), (29) or (38), g( ) is a vector function of this test quantity, k is a number (possibly infinity), T is the RoT estimation sampling period, and f(,) is the vector test quantity function which is of no further concern in this invention.

Embodiments of the invention as herein described allow load to be measured after interference suppression processing. The load after interference suppression can be used to monitor the stability of a fast power control loop in WCDMA. The load after interference suppression is more relevant to stability monitoring than conventional a measures of the air interface load, As a result, the stability of the uplink power control loops is improved.

Annex A

GRAKE+ RoT 1.1 Measurement of Load after IS in GRAKE+ and Chip Equalizers

To see how load can be estimated taking account of the GRAKE+ IS gain, the powers after weight combining are studied at sufficient statistics level. First, it is assumed that the received signal of user u on code $k \in \Omega_u$ is $$y_{u,k} = h_u s_{u,k} + I_{u,k} + N_{u,k}, u=1,\ldots,U, k=1,\ldots,K \tag{A1}$$

where $\Omega_u$ denotes the set of codes for user u, $s_{u,k}$, u=1, ..., U, k=1, ..., K, is the signal, $I_{u,k}$, u=1, ..., U, k=1, ..., K, is the interference and $N_{u,k}$, u=1, ..., U, k=1, ..., K, is the (thermal) noise signal (not power) and $\hat{h}_u$, u=1, ..., U, is the net channel response of user u. GRAKE+ then performs weight combining to get the sufficient statistics $z_{u,k}^{G+}$ according to the equations $$\hat{z}_{u,k}^{G+} = \hat{w}_u^H y_{u,k} = \hat{w}_u^H \hat{h}_u s_{u,k} + \hat{w}_u^H I_{u,k} + \hat{w}_u^H N_{u,k},$$
$$u=1,\ldots,U, k=1,\ldots,K \tag{A2}$$

$$\hat{R}_u \hat{w}_u = \hat{h}_u, u=1,\ldots,U \tag{A3}$$

Here $\hat{w}_u$ are the combining weights of GRAKE+, whereas the estimated covariance matrix that models the interference for computation of the combining weights for the users u is given by $\hat{R}_u$. Equations (A2) and (A3) have two main implications; one indicating how power measurements can be done and one indicating the scale factor problem which is addressed below.

Using equation (A2) it can be seen that the effect of the GRAKE+ weight combining is the same as if an artificial received signal $z_{u,k}^{G+}$ would be processed. Since these signals obviously reflect the weight combining and thereby the IS gains of the GRAKE+ receiver, $z_{u,k}^{G+}$, u=1, ..., U, k=1, ..., K, is believed to be a relevant starting point for load estimation.

As stated above, the load estimator operates by processing of the RTWP and in the future possibly the RSEPS. For this reason, similar power signals need to be formed from the $z_{u,k}^{G+}$, u=1, ..., U, k=1, ..., K, in order to reuse the load concept applied without IS.

Note: It is not clear if the proposed approach to reuse the load concept applied without IS is precise or optimal. At the present time it is the only approach available. A further study using first principles from information theory is recommended in the longer time frame.

1.2 User Powers Associated with a GRAKE+ Sufficient Statistics

Squaring (A2) and assuming a low degree of correlation between its three terms, leads to $$|\hat{z}_{u,k}^{G+}|^2 \approx \hat{w}_u^H \hat{h}_u \hat{h}_u^H \hat{w}_u |s_{u,k}|^2 + \hat{w}_u^H I_{u,k} I_{u,k}^H \hat{w}_u +$$
$$\hat{w}_u^H N_{u,k} N_{u,k}^H \hat{w}_u = S_{u,k}^{G+} + I_{u,k}^{G+} + N_{u,k}^{G+},$$
$$u=1,\ldots,U, k=1,\ldots,K. \tag{A4}$$

The rise over thermal, as seen by user u is now (1), by definition $$RoT_u^{G+} \equiv \frac{S_u^{G+} + I_u^{G+} + N_u^{G+}}{N_u^{G+}} \tag{A5}$$

$$S_u^{G+} = \sum_{k \in \Omega_u} S_{u,k}^{G+} \tag{A6}$$

$$I_u^{G+} = \sum_k I_{u,k}^{G+} \tag{A7}$$

$$N_u^{G+} = \sum_k N_{u,k}^{G+}. \tag{A8}$$

Note that it is unclear how to distinguish between $S_{u,k}^{G+}$, $I_{u,k}^{G+}$ and $N_{u,k}^{G+}$ for $k \in \Omega_u$. The algorithm disclosed here avoids many of these problems, since both $I_{u,k}^{G+}$ and $N_{u,k}^{G+}$ are computed from other quantities. Note further that in (A4) $S_{u,k}^{G+} = \hat{w}_u^H \hat{h}_u \hat{h}_u^H \hat{w}_u |s_{u,k}|^2$, i.e. the power is expressed starting with the (transmitted) code power $|s_{u,k}|^2$. The same quantity $S_{u,k}^{G+}$ can also be expressed starting with the antenna power $|e_{u,k}|^2 = \hat{h}_u^H \hat{h}_u |s_{u,k}|^2$, in which case $S_{u,k}^{G+} = \hat{w}_u^H \hat{w}_u |e_{u,k}|^2$. This latter setting is used in the link simulations used for validation of the concept. The algorithmic development that follows does however use the definitions (A4)-(A8).

1.3 Computation of $S_u^{G+}$

The signal power is computed directly from (A6). Using (A4) and (A6) then results in $$S_u^{G+} = \sum_{k \in \Omega_u} S_{u,k}^{G+} = \hat{w}_u^H \hat{h}_u \hat{h}_u^H \hat{w}_u \sum_{k \in \Omega_u} |s_{u,k}|^2 \tag{A9}$$

$$= \hat{w}_u^H \hat{h}_u \hat{h}_u^H \hat{w}_u \hat{E}_{s,u} = \left|\hat{w}_u^H \hat{h}_u\right|^2 \hat{E}_{s,u},$$

$$u = 1, \ldots, U$$

Note that computation of the signal energy $\hat{E}_{s,u}$ is quite intricate, including e.g. the involved beta factors.

1.4 Computation of $N_u^{G+}$ 1.4.1 White Noise Power Floor

The idea here is to rely on the baseline thermal noise power floor estimation algorithm to estimate the thermal noise power floor before any GRAKE+ processing. A main problem then arises since the thermal noise is scaled by $\hat{w}_u$ when the sufficient statistics is evaluated. This means that the thermal noise power level will no longer appear constant. The approach taken here to circumvent this problem builds on the calculation of the scale factor by which the thermal noise power is scaled. To compute this quantity, first note that when the wideband thermal noise power floor is estimated before GRAKE+ processing, e.g. with the baseline noise floor estimator, the following quantity is estimated $$\hat{N} = \frac{1}{M} \sum_{m=1}^{M} \sum_{k=1}^{K} (N_{u,k}^m)^H N_{u,k}^m \xrightarrow[M \to \infty]{} KE[(N_{u,k})^H N_{u,k}] \tag{A10}$$

$$= K P_{N_{u,k}}$$

$$= K \frac{1}{K} P_N$$

$$= N_0,$$

where $N_0$ is the thermal noise power floor and where m is the sample summation index. The power at the sufficient statistics signal processing point is however $$\hat{N}^{G+} = \frac{1}{M}\sum_{m=1}^{M}\sum_{k=1}^{K}(\hat{w}_u^H N_{u,k}^m)^H \hat{w}_u^H N_{u,k}^m \quad (A11)$$

$$= \frac{1}{M}\sum_{m=1}^{M}\sum_{k=1}^{K} tr\left((\hat{w}_u^H N_{u,k}^m)^H \hat{w}_u^H N_{u,k}^m\right)$$

$$= \frac{1}{M}\sum_{m=1}^{M}\sum_{k=1}^{K} tr\left(\hat{w}_u^H N_{n,k}^m (\hat{w}_u^H N_{u,k}^m)^H\right)$$

$$= \frac{1}{M}\sum_{m=1}^{M}\sum_{k=1}^{K} tr\left(\hat{w}_u^H N_{u,k}^m (N_{u,k}^m)^H \hat{w}_u\right)$$

$$= tr\left(\sum_{k=1}^{K}\hat{w}_u^H\left(\frac{1}{M}\sum_{m=1}^{M}N_{u,k}^m(N_{u,k}^m)^H\right)\hat{w}_u\right)_{M\to\infty}$$

$$tr(K\hat{w}_u^H E[N_{u,k}(N_{u,k})^H]\hat{w}_u)$$

$$= tr(K\hat{w}_u^H (N_0/K)I\hat{w}_u)$$

$$= \hat{w}_u^H \hat{w}_u N_0$$

$$= \hat{w}_u^H \hat{w}_u \hat{N}.$$

The conclusion is that the thermal noise floor at the sufficient statistics signal point can be obtained from the noise floor estimate before GRAKE+ processing, by a multiplication with the scale factor $$\kappa_u^{G+} = (\hat{w}_u)^H \hat{w}_u, u=1,\ldots,U \quad (A12)$$

This gives $$N_u^{G+} = \kappa_u^{G+}\hat{N}, u=1,\ldots,U \quad (A13)$$

The computation of the scale factor requires an additional inner product for each user.

1.4.2 Colored Noise Power Floor

This subsection discusses the case where the result of (A10) is replaced by the more general assumption $$\frac{1}{M} = \sum_{m=1}^{M}\sum_{k=1}^{K} N_{u,k}^m (N_{u,k}^m)^H \xrightarrow[M\to\infty]{} KE[N_{u,k}(N_{u,k})^H] \quad (A14)$$

$$= K\frac{N_0}{K}R_N$$

$$= N_0 R_N,$$

i.e. the case when sampling is fast enough to reflect the shape of the uplink spectrum. In this case it follows that (A10) is transformed to $$\hat{N} = \frac{1}{M}\sum_{m=1}^{M}\sum_{k=1}^{K}(N_{u,k}^m)^H N_{u,k}^m \xrightarrow[M\to\infty]{} KE[(N_{u,k})^H N_{u,k}] \quad (A15)$$

$$= Ktr(E[N_{u,k}(N_{u,k})^H])$$

$$= N_0 tr(R_N)$$

Furthermore, (A11) is transformed into $$\hat{N}^{G+} = N_0 tr(\hat{w}_u^H R_N \hat{w}_u) \quad (A16)$$

The end result in this case is the scale factor $$\kappa_u^{G+} = \frac{tr(\hat{w}_u^H R_N \hat{w}_u)}{tr(R_N)} \quad (A17)$$

1.5 Computation of $I_U^{G+}$ Using Available SINRs

The code power to interference ratio is, $$(C/I)_u^{G+} = \frac{S_u^{G+}}{I_u^{G+} + N_u^{G+}}, u=1,\ldots,U \quad (A18)$$

It can be noted that in (A18), all quantities except $I_u^{G+}$ have been computed, see (A11) and (A13). Using these quantities, (A18) can be solved for $I_u^{G+}$, giving $$I_u^{G+} = \frac{S_u^{G+}}{(C/I)_u^{G+}} - \kappa_u^{G+}\hat{N}, u=1,\ldots,U. \quad (A19)$$

The quantity $(C/I)_u^{G+}$ can be directly related to SINR. This is performed as $$(C/I)_u^{G+} = \frac{\left(\beta_{u,DPCCH}^2 + \beta_{u,EDPCCH}^2 + n_{u,codes}\beta_{u,EDPDCH}^2\right)}{\beta_{u,DPCCH}^2 SF_{u,DPCCH}}SINR_u^{G+} \quad (A20)$$

$$= \frac{\beta_{u,effective}^2}{SF_{u,DPCCH}}SINR_u^{G+}$$

which gives $$I_u^{G+} = \frac{S_u^{G+}}{(C/I)_u^{G+}} - \kappa_u^{G+}\hat{N} = \frac{SF_{u,DPCCH}}{\beta_{u,effective}^2}\frac{S_u^{G+}}{SINR_u^{G+}} - \kappa_u^{G+}\hat{N}. \quad (A21)$$

1.6 Computation of Combination of $RoT_u^{G+}$

When (A9), (A13) and (21) are inserted in (A5), the end result becomes $$RoT_u^{G+} \equiv \frac{S_u^{G+} + I_u^{G+} + \kappa_u^{G+}\hat{N}}{\kappa_u^{G+}\hat{N}} \quad (A22)$$

$$= \frac{S_u^{G+}}{\kappa_u^{G+}\hat{N}}\left(1 + \frac{SF_{u,DPCCH}}{\beta_{u,effective}^2}\frac{1}{SINR_u^{G+}}\right)$$

$$u = 1,\ldots,U.$$

These measures, for, each user, are then combined into an uplink measure as outlined below. Note that (A22) provides some interesting insights. When SINR is high then the RoT for the user is essentially determined by the remaining own power of the user—the RoT then increases when the SINR gets worse.

1.7 Uplink Load Measure for GRAKE+

It is clear that that the user that sees the maximum total load is the one worst off in terms of coverage and stability. That user is hence used to address the load of the UL of the cell. The worst case load is defined by the equations $$u_{max} = \underset{u}{\operatorname{argmax}}(RoT_u^{G+}) \quad (A23)$$

$$\max(RoT_u^{G+}) = RoT_{u_{max}}^{G+} \quad (A24)$$

Annex B

GRAKE+ Noise Rise and Stability

1.8 A Load Measure Directly Assessing Cell Stability after GRAKE+ Processing As stated above the RoT is a general load measure in WCDMA systems. Since it includes the neighbour cell interference it e.g. captures coverage effects of load changes. However, sometimes it is desirable to have access to load measures that directly assess the stability only of the serving cell. The purpose of the present section is to define a measure that addresses this need.

To achieve this goal it can be noted that in normal operation the uplink cell stability is mainly affected by the powers that are under inner loop power control, by the RBS. This is not perfectly true though, remembering that the inner loop power control loops are nonlinear and coupled and therefore it is not easily guaranteed that large neighbour cell power increases may not affect the cell stability after all. Put otherwise, cell stability is coupled to feasibility which under certain conditions is tied to the RoT.

The above discussion is however somewhat idealized. First, the feasibility analysis is normally based on assumptions that the uplink is shared by a relatively large number of users, allowing interferers to be treated as noise sources. Secondly, the rise over thermal after GRAKE+ processing is an individual measure for each user—no formal proof is available on its precise relation to the uplink cell load and the cell stability issue. For this reason it seems reasonable to address also other measures than the RoT. In order to obtain a noise rise measure for stability the neighbour cell interference can be subtracted from the RoT of (A5), to yield $$NR_u^{G+} \equiv \frac{S_u^{G+} + I_u^{G+} + \kappa_u^{G+}\hat{N} - I_{u,neighbor}^{G+}}{\kappa_u^{G+}\hat{N}}, u = 1, \ldots, U \quad (B1)$$

This load measure is valid for each user, after GRAKE+ processing.

1.9 Neighbor Cell Interference Estimation

In order to come up with an estimate of the neighbor cell interference after GRAKE+ processing ($I_{u,neighbor}^{G+}$) two simplifying assumptions are necessary. These include

- The own cell interference dominates over the neighbor cell interference. This assumption is surely not always true. However, it is when the own cell interference dominates that stability of the own cell is most at stake—hence the case with dominating neighbor cell interference is less relevant from a stability point of view.
- The neighbor cell interference can be treated as generated by a white noise process.

Using these assumptions the neighbor cell interference can be treated as the thermal noise power floor, resulting in $$\hat{I}_{u,neighbor}^{G+} = \frac{1}{M}\sum_{m=1}^{M}\sum_{k=1}^{K}\left(\hat{w}_u^H I_{u,neighbor,k}^m\right)^H \hat{w}_u^H I_{u,neighbor,k}^m \quad (B2)$$

$$= \frac{1}{M}\sum_{m=1}^{M}\sum_{k=1}^{K} tr\left(\left(\hat{w}_u^H I_{u,neighbor,k}^m\right)^H \hat{w}_u^H I_{u,neighbor,k}^m\right)$$

$$= \frac{1}{M}\sum_{m=1}^{M}\sum_{k=1}^{K} tr\left(\hat{w}_u^H I_{u,neighbor,k}^m \left(\hat{w}_u^H I_{u,neighbor,k}^m\right)^H\right)$$

$$= \frac{1}{M}\sum_{m=1}^{M}\sum_{k=1}^{K} tr\left(\hat{w}_u^H I_{u,neighbor,k}^m (I_{u,neighbor,k}^m)^H \hat{w}_u\right)$$

$$= tr\left(\sum_{k=1}^{K}\hat{w}_u^H \left(\frac{1}{M}\sum_{m=1}^{M} I_{u,neighbor,k}^m (I_{u,neighbor,k}^m)^H\right)\hat{w}_u\right)_{M\to\infty}$$

$$tr\left(\hat{w}_u^H E[I_{u,neighbor}(I_{u,neighbor})^H]\hat{w}_u\right)$$

$$= tr\left(\hat{w}_u^H (\hat{I}_{u,neighbor})I\hat{w}_u\right)$$

$$= \hat{w}_u^H \hat{w}_u \hat{I}_{u,neighbor}.$$

This gives $$I_{u,neighbor}^{G+} = \kappa_u^{G+}\hat{I}_{u,neighbor}, u = 1, \ldots, U \quad (B3)(28)$$

where $\hat{I}_{u,neighbor}^{G+}$ is the neighbor cell interference power as estimated before GRAKE+ processing, i.e. at the same signal point as where $\hat{N}$ is estimated. Note that normally the neighbor cell interference is lower than the own cell interference, therefore the approximations associated with the neighbor cell interference have less impact on the final result than what the corresponding assumptions on the own cell interference would have.

This means that the neighbor cell interference may be estimated before GRAKE+ processing followed by a scaling to achieve a neighbor cell interference value after GRAKE+ processing.

One set of means that allows for neighbor cell interference estimation before GRAKE+ processing has e.g. been defined in T. Wigren, "Soft uplink load estimation in WCDMA", IEEE Trans Veh. Tech., March, 2009 (hereinafter "Wigren"), where a quantity representing a sum of neighbor cell interference and thermal noise power is obtained. Since the noise power floor is also estimated it follows that an estimate of the neighbor cell interference can be made available before GRAKE+ processing. Note that the solution in Wigren requires that a RAKE receiver for each user is used as well, in order to obtain a measure of all own cell user powers.

1.9.1 The Cell Stability Load Measure for a User after GRAKE+ Interference Whitening Using (A22), and (B1)-(B3) results in $$NR_u^{G+} \equiv \frac{S_u^{G+} + I_u^{G+} + \kappa_u^{G+}\hat{N} - I_{u,neighbor}^{G+}}{\kappa_u^{G+}\hat{N}} \quad (B4)$$

$$= \frac{S_u^{G+}}{\kappa_u^{G+}\hat{N}}\left(1 + \frac{SF_{u,EDPCCH}}{\beta_{u,effective}^2}\frac{1}{SINR_u^{G+}}\right) - \frac{\hat{I}_{neighbor}}{\hat{N}}$$

since before GRAKE+ processing the neighbor cell interference is independent of the user.

1.10 UL Load Measure for Cell Stability

It is clear that that the user that sees the maximum total load is the one worst off in terms of coverage and stability. That user is hence used to address the load of the UL of the cell. The worst case load is defined by the equations $$u_{max} = \underset{u}{\operatorname{argmax}}(NR_u^{G+}) \quad (B5)(35)$$

$$\max(NR_u^{G+}) = NR_{u_{max}}^{G+} \quad (B6)$$

Annex C

FDPE RoT

1.11 The Signal after FDPE

The pre-equalized wideband signal in the frequency domain, denoted $Z_{pre}(m)$, is given by:

$$Z_{pre}(m) = W_{pre}(m)H(m)Z(m) + W_{pre}(m)I(m) + W_{pre}(m)N^{thermal}(m). \quad (C1)$$

$W_{pre}(m)$ denotes the wideband pre-equalizing filter in the frequency domain, $H(m)$ denotes the wideband net channel response in the frequency domain, $Z(m)$ denotes the wideband transmitted signal in the frequency domain, $I(m)$ denotes the wideband neighbor cell interference in the frequency domain and $N^{thermal}(m)$ denotes the wideband thermal noise floor signal in the frequency domain. The equation (C1) is readily transformed to the time domain with an inverse discrete Fourier transformation, rendering $$z_{pre}(t) = (w_{pre}h)(t) * z(t) + w_{pre}(t) * i(t) + w_{pre}(t) * n^{thermal}(t) \quad (C2)$$

where the star denotes (multi-dimensional) convolution $z_{pre}(t)$ denotes the pre-equalized wideband signal in the time domain, $w_{pre}(t)$ denotes the wideband finite impulse response of the pre-equalizing filter in the time domain, $h(t)$ denotes the wideband finite impulse response net channel response in the time domain, $z(t)$ denotes the wideband transmitted signal in the time domain, $i(t)$ denotes the wideband neighbor cell interference in the time domain and $n^{thermal}(t)$ denotes the wideband thermal noise floor signal in the time domain. It is important to understand that all signal quantities are here given before the pre-equalization step.

1.12 Measuring Load after FDPE

1.12.1 Load Definition

To obtain a measure of the load after FDPE interference whitening the RoT after this step is considered. This is in fact more appealing than for the GRAKE+ receiver in that the whole uplink load is addressed at the same time. The RoT measure after FDPE processing is given by $$RoT^{FDPE}(t) = \frac{z_{pre}^H(t) z_{pre}(t)}{E[(w_{pre}(t) * n^{thermal}(t))^H (w_{pre}(t) * n^{thermal}(t))]} \quad (C3)$$

1.12.2 Computation of the Numerator of (C3)

The numerator of (C3) is straightforward to compute. Noting that the time scale for the RoT measurement in WCDMA is normally a transmission time interval (TTI), it follows that the numerator of (14) can be computed e.g. by an average of time samples over the TTI of interest (typically 2 ms or 10 ms).

1.12.3 Computation of the Denominator of (C3)

The computation of the denominator of (C3) requires an evaluation of the expectation of that expression. This can be done assuming the thermal noise to be white and stationary, which is a standard assumption. Note that the evolution here therefore is performed over the time interval where the pre-equalization filter remains constant. It then follows that $$E\left[(w_{pre}(t) * n^{thermal}(t))^H (w_{pre}(t) * n^{thermal}(t))\right] = \quad (C4)$$

$$E\left[\sum_{l_1=0}^{L-1} (n^{thermal}(t-l_1))^H w_{pre}^H(l_1) \sum_{l_2=0}^{L-1} w_{pre}(l_2) n^{thermal}(t-l_2)\right] =$$

$$E\left[\left(\sum_{l_1=0}^{L-1} \sum_{l_2=0}^{L-1} (n^{thermal}(t-l_1))^H w_{pre}^H(l_1) w_{pre}(l_2) n^{thermal}(t-l_2)\right)\right] =$$

$$E\left[\sum_{l_1=0}^{L-1} \sum_{l_2=0}^{L-1} w_{pre}^H(l_1) w_{pre}(l_2)(n^{thermal}(t-l_1))^H n^{thermal}(t-l_2)\right] =$$

$$\sum_{l_1=0}^{L-1} \sum_{l_2=0}^{L-1} w_{pre}^H(l_1) w_{pre}(l_2) E\left[(n^{thermal}(t-l_1))^H n^{thermal}(t-l_2)\right]$$

$$\sum_{l_1=0}^{L-1} \sum_{l_2=0}^{L-1} w_{pre}^H(l_1) w_{pre}(l_2) \delta_{l_1,l_2} \sum_{a=1}^{A} \hat{N}_a^{thermal} =$$

$$\left(\sum_{l=0}^{L-1} w_{pre}^H(l) w_{pre}(l)\right)\left(\sum_{a=1}^{A} \hat{N}_a^{thermal}\right).$$

In (C4) $\hat{N}_a^{thermal}$ denotes the estimated thermal noise floor of antenna branch a, before pre-equalization. This means that prior art noise floor estimation algorithms of [1]-[3] can be re-used. One algorithm is needed for each antenna branch.

1.12.4 Load Estimate and Block Diagram

Combining (C3) and (C4) results in $$RoT^{FDPE} = \frac{z_{pre}^H(t) z_{pre}(t)}{\left(\sum_{l=0}^{L-1} w_{pre}^H(l) w_{pre}(l)\right)\left(\sum_{a=1}^{A} \hat{N}_a^{thermal}\right)}. \quad (C5)$$

The quantities above should be computed as averages or estimates over a time interval where the whitening filter of the FDPE remains constant. The result is intuitive. Since the total received wideband power is summed over all antenna branches, so is the thermal noise power floor. The RoT after FDPE is also scaled with the power of the pre-whitening filter.

Annex D

FDPE Noise Rise for Stability

1.13 Measuring Stability Related Load after FDPE

1.13.1 Load Definition

To obtain a measure of the load after the FDPE interference whitening, the RoT after this step is first considered. The RoT measure after FDPE processing is given by $$RoT^{FDPE}(t) = \frac{z_{pre}^H(t) z_{pree}(t)}{E[(w_{pre}(t) * n^{thermal}(t))^H (w_{pre}(t) * n^{thermal}(t))]} \quad (D1)$$

In order to address the stability related load the neighbor cell interference, as seen after the FDPE processing needs to be subtracted from the numerator. This follows since the neighbor cell interference does not affect the stability of the own cell since the neighbor cell interference is not controlled by said first cell, i.e.

$$NR^{FDE}(t) = \frac{z_{pre}^H(t) z_{pre}(t) - \hat{I}_{pre}^{neighbor}(t)}{E[(w_{pre}(t) * n^{thermal}(t))^H (w_{pre}(t) * n^{thermal}(t))]}, \quad (D2)$$

where $\hat{I}_{pre}^{neighbor}(t)$ is the neighbor cell interference as seen after FDPE processing.

1.13.2 Computation of the First Part of the Numerator of (27)

The first part of the numerator of (D2) is computed as in annex C.

1.13.3 Neighbor Cell Interference Estimation

In order to come up with an estimate of the neighbor cell interference after FDPE processing ($\hat{I}_{pre}^{neighbor}$) two simplifying assumptions are necessary. These include

- The own cell interference dominates over the neighbor cell interference. This assumption is surely not always true. However, it is when the own cell interference dominates that stability of the own cell is most at stake—hence the case with dominating neighbor cell interference is less relevant from a stability point of view.
- The neighbor cell interference can be treated as generated by a white noise process.

Using these assumptions the neighbor cell interference can be treated as the thermal noise power floor, resulting in $$\hat{I}_{pre}^{neighbor}(t) = E\left[(w_{pre}(t) * i^{neighbor}(t))^H (w_{pre}(t) * i^{neighbor}(t))\right] = \quad (D3)$$

$$E\left[\sum_{l_1=0}^{L-1}(i^{neighbor}(t-l_1))^H w_{pre}^H(l_1) \sum_{l_2=0}^{L-1} w_{pre}(l_2) i^{neighbor}(t-l_2)\right] =$$

$$\left[\left(\sum_{l_1=0}^{L-1}\sum_{l_2=0}^{L-1}(i^{neighbor}(t-l_1))^H w_{pre}^H(l_1) w_{pre}(l_2) i^{neighbor}(t-l_2)\right)\right] =$$

$$E\left[\sum_{l_1=0}^{L-1}\sum_{l_2=0}^{L-1} w_{pre}^H(l_1) w_{pre}(l_2) (i^{neighbor}(t-l_1))^H i^{neighbor}(t-l_2)\right] =$$

$$\sum_{l_1=0}^{L-1}\sum_{l_2=0}^{L-1} w_{pre}^H(l_1) w_{pre}(l_2)$$

$$E\left[(i^{neighbor}(t-l_1))^H i^{neighbor}(t-l_2)\right]$$

$$\sum_{l_1=0}^{L-1}\sum_{l_2=0}^{L-1} w_{pre}^H(l_1) w_{pre}(l_2)\delta_{l_1,l_2} \hat{I}^{neighbor}(t) = \sum_{l=0}^{L-1} w_{pre}^H(l) w_{pre}(l) \hat{I}^{neighbor}(t)$$

Here $\hat{I}_{pre}^{neighbor}(t)$ is the neighbor cell interference power as estimated before FDPE processing, i.e. at the same signal point as where $\hat{N}$ is estimated. Note that normally the neighbor cell interference is lower than the own cell interference, therefore the approximations associated with the neighbor cell interference have less impact on the final result than what the corresponding assumptions on the own cell interference would have.

This means that the neighbor cell interference may be estimated before FDPE processing followed by a scaling to achieve a neighbor cell interference value after FDPE processing.

One set of means that allows for neighbor cell interference estimation before FDPE processing has e.g. been defined in Wigren, where a quantity representing a sum of neighbor cell interference and thermal noise power is obtained. Since the noise power floor is also estimated it follows that an estimate of the neighbor cell interference can be made available before FDPE processing. Note that the solution in Wigren requires that a RAKE receiver for each user is used as well, in order to obtain a measure of all own cell user powers.

1.13.4 Computation of the Denominator of (D2)

The computation of the denominator of (D2) is performed as in Annex C.

1.13.5 Load Estimate

Combining (D2), (D3) and (C4) results in $$NF^{FDPE}(t) = \frac{z_{pre}^H(t) z_{pre}(t) - \left(\sum_{l=0}^{L-1} w^H(l)w(l)\right) \hat{I}^{neighbor}(t)}{\left(\sum_{l=0}^{L-1} w_{pre}^H(l) w_{pre}(l)\right)\left(\sum_{a=1}^{A} \hat{N}_a^{thermal}\right)} \quad (D4)$$

$$= \frac{z_{pre}^H(t) z_{pre}(t)}{\left(\sum_{l=0}^{L-1} w_{pre}^H(l) w_{pre}(l)\right)\left(\sum_{a=1}^{A} \hat{N}_a^{thermal}\right)} - \frac{\hat{I}^{neighbor}(t)}{\left(\sum_{a=1}^{A} \hat{N}_a^{thermal}\right)}.$$

The quantities above should be computed as averages or estimates over a time interval where the interference suppressing filter of the FDPE remains constant. The result is intuitive. Since the total received wideband power is summed over all antenna branches, so is the thermal noise power floor. The RoT after FDPE is also scaled with the power of the equalizing filter.

Annex E

FDE RoT

1.14 The Signal after FDE

The pre-equalized wideband signal in the frequency domain, denoted $Z_{FDE}$(in), is given by:

$$Z_{FDE}(m) = W(m)H(m)Z(m) + W(m)I(m) + W(m)N^{thermal}(m), \quad (E1)$$

W(m) denotes the wideband MMSE equalizing filter in the frequency domain, H(m) denotes the wideband net channel response in the frequency domain, Z(m) denotes the wideband transmitted signal in the frequency domain, I(m) denotes the wideband neighbor cell interference in the frequency domain and $N^{thermal}(m)$ denotes the wideband thermal noise floor signal in the frequency domain. All signals are vector valued. The equation (E1) is readily transformed to the time domain with an inverse discrete Fourier transformation, rendering $$z_{FDE}(t) = (wh)(t)*z(t) + w(t)*i(t) + w(t)*n^{thermal}(t), \quad (E2)$$

where the star denotes (multi-dimensional) convolution, $z_{pre}$(t) denotes the equalized wideband signal in the time domain, w(t) denotes the wideband finite impulse response of the equalizing filter in the time domain, h(t) denotes the wideband finite impulse response net channel response in the time domain, z(t) denotes the wideband transmitted signal in the time domain, i(t) denotes the wideband neighbor cell interference in the time domain and $n^{thermal}(t)$ denotes the wideband thermal noise floor signal in the time domain.

1.15 Measuring Load after FDE

1.15.1 Load Definition

To obtain a measure of the load after the FDE interference whitening, the RoT after this step is considered. The RoT measure after FDPE processing is given by $$RoT_u^{FDE}(t) = \frac{z_{FDE,u}^H(t) z_{FDE_u}(t)}{E[(w_u(t)*n^{thermal}(t))^H (w_u(t)*n^{thermal}(t))]} \quad (E3)$$

1.15.2 Computation of the Numerator of (E3)

The numerator of (E3) is straightforward to compute. Noting that the time scale for the RoT measurement in WCDMA is normally a transmission time interval (TTI), it follows that the numerator of E3 can be computed e.g. by an average of time samples over the TTI of interest (typically 2 ms or 10 ms).

1.15.3 Computation of the Denominator of (E3)

The computation of the denominator of (E3) requires an evaluation of the expectation of that expression. This can be done assuming the thermal noise to be white and stationary, which is a standard assumption. Note that the evolution here therefore is performed over the time interval where the pre-equalization filter remains constant. It then follows that $$E\left[(w_u(t) * n^{thermal}(t))^H (w_u(t) * n^{thermal}(t))\right] = \quad (E4)$$

$$E\left[\sum_{l_1=0}^{L-1}(n^{thermal}(t-l_1))^H w_u^H(l_1)\sum_{l_2=0}^{L-1} w_u(l_2)n^{thermal}(t-l_2)\right] =$$

$$E\left[\sum_{l_1=0}^{L-1}\sum_{l_2=0}^{L-1}(n^{thermal}(t-l_1))^H w_u^H(l_1)w_u(l_2)n^{thermal}(t-l_2)\right] =$$

$$E\left[\sum_{l_1=0}^{L-1}\sum_{l_2=0}^{L-1} w_u^H(l_1)w_u(l_2)(n^{thermal}(t-l_1))^H n^{thermal}(t-l_2)\right] =$$

$$\sum_{l_1=0}^{L-1}\sum_{l_2=0}^{L-1} w_u^H(l_1)w_u(l_2) E\left[(n^{thermal}(t-l_1))^H n^{thermal}(t-l_2)\right]$$

$$\sum_{l_1=0}^{L-1}\sum_{l_2=0}^{L-1} w_u^H(l_1)w_u(l_2)\delta_{l_1,l_2}\sum_{a=1}^{A} \hat{N}_a^{thermal} =$$

$$\left(\sum_{l=0}^{L-1} w_u^H(l)w_u(l)\right)\left(\sum_{a=1}^{A}\hat{N}_a^{thermal}\right).$$

In (E4) $\hat{N}_a^{thermal}$ denotes the estimated thermal noise floor of antenna branch a, before pre-equalization. This means that conventional noise floor estimation algorithms can be re-used. One algorithm is needed for each antenna branch. Algorithms for estimating the noise floor are given in E. Dahlman, S. Parkvall, J. Sköld and P. Beming, "3G Evolution—HSPA and LTE for mobile broadband—section 5.1" 2:nd edition, Academic Press, 2008; T. Wigren, "Fast congestion control with IS receivers", Invention disclosure, November, 2010; and T. Wigren, "Load estimation in interference whitening systems", WO 2010/144004 A1, 11 Jun. 2009.

1.15.4 Load Estimate

Combining (E3) and (E4) results in $$RoT_u^{FDE} = \frac{z_{FDE,u}^H(t)z_{FDE,u}(t)}{\left(\sum_{l=0}^{L-1} w_u^H(l)w_u(l)\right)\left(\sum_{a=1}^{A}\hat{N}_a^{thermal}\right)}, u=1,\ldots,U \quad (E5)$$

The quantities above should be computed as averages or estimates over a time interval where the equalizing filter of the FDE remains constant. The result is intuitive. Since the total received wideband power is summed over all antenna branches, so is the thermal noise power floor. The RoT after FDE is also scaled with the power of the equalizing filter.

1.15.4.1 Combination of Users

The above discussion has focused on a single user. However, what is interesting is a load measure for the complete uplink. Since it is likely that it is the user that experiences the highest load that limits the uplink, the uplink load is defined to be $$RoT = \max_u RoT_u^{FDE}, \quad (E6)$$

where $RoT_u^{FDE}$ is the noise rise of user u.

Annex F

FDE Noise Rise for Stability

1.16 Measuring Stability Related Load after FDE

1.16.1 Load Definition

To obtain a measure of the load after the FDE interference whitening, the RoT after this step is first considered. The RoT measure after FDE processing is given by $$RoT_u^{FDE}(t) = \frac{z_{FDE,u}^H(t)z_{FDE,u}(t)}{E[(w_u(t)*n^{thermal}(t))^H(w_u(t)*n^{thermal}(t))]} \quad (F1)$$

In order to address the stability related load the neighbor cell interference, as seen after the FDE processing needs to be subtracted from the numerator. This follows since the neighbor cell interference does not affect the stability of the own cell since the neighbor cell interference is not controlled by said first cell, i.e.

$$NR_u^{FDE}(t) = \frac{z_{FDE,u}^H(t)z_{FDE,u}(t) - \hat{I}_{FDE,u}^{neighbor}(t)}{E[(w_u(t)*n^{thermal}(t))^H(w(t)*n^{thermal}(t))]}, \quad (F2)$$

where $\hat{I}_{FDE,u}^{neighbor}(t)$ is the neighbor cell interference—again experienced by a specific user.

1.16.2 Computation of the First Part of the Numerator of (F2)

The first part of the numerator of (F2) is computed as in Annex E.

1.16.3 Neighbor Cell Interference Estimation

In order to come up with an estimate of the neighbor cell interference after FDE processing ($\hat{I}_{FDE,u}^{neighbor}$) two simplifying assumptions are necessary. These include

- The own cell interference dominates over the neighbor cell interference. This assumption is surely not always true. However, it is when the own cell interference dominates that stability of the own cell is most at stake—hence the case with dominating neighbor cell interference is less relevant from a stability point of view.
- The neighbor cell interference can be treated as generated by a white noise process.

Using these assumptions the neighbor cell interference can be treated as the thermal noise power floor, resulting in $$\hat{I}_{FDE,u}^{neighbor}(t) = E\left[(w_u(t)*i^{neighbor}(t))^H(w_u(t)*i^{neighbor}(t))\right] = \quad (F3)$$

$$E\left[\sum_{l_1=0}^{L-1}(i^{neighbor}(t-l_1))^H w_u^H(l_1)\sum_{l_2=0}^{L-1} w_u(l_2)i^{neighbor}(t-l_2)\right] =$$

-continued $$E\left[\left(\sum_{l_1=0}^{L-1}\sum_{l_2=0}^{L-1}(\hat{I}^{neighbor}(t-l_1))^H w_u^H(l_1)w_u(l_2)\hat{I}^{neighbor}(t-l_2)\right)\right]=$$

$$E\left[\sum_{l_1=0}^{L-1}\sum_{l_2=0}^{L-1}w_u^H(l_1)w_u(l_2)(\hat{I}^{neigbor}(t-l_1))^H \hat{I}^{neighbor}(t-l_2)\right]=$$

$$\sum_{l_1=0}^{L-1}\sum_{l_2=0}^{L-1}w_u^H(l_1)w_u(l_2)$$

$$E\left[(\hat{I}^{neighbor}(t-l_1))^H \hat{I}^{neighbor}(t-l_2)\right]$$

$$\sum_{l_1=0}^{L-1}\sum_{l_2=0}^{L-1}w_u^H(l_1)w_u(l_2)\delta_{l_1,l_2}\hat{I}^{neighbor}(t)=\sum_{l=0}^{L-1}w_u^H(l)w_u(l)\hat{I}^{neighbor}(t)$$

Here $\hat{I}^{neighbor}(t)$ is the neighbor cell interference power as estimated before FDE processing, i.e. at the same signal point as where $\hat{N}$ is estimated. Note that normally the neighbor cell interference is lower than the own cell interference, therefore the approximations associated with the neighbor cell interference have less impact on the final result than what the corresponding assumptions on the own cell interference would have.

This means that the neighbor cell interference may be estimated before FDE processing followed by a scaling to achieve a neighbor cell interference value after FDE processing. One set of means that allows for neighbor cell interference estimation before FDE processing has e.g. been defined in [2], where a quantity representing a sum of neighbor cell interference and thermal noise power is obtained. Since the noise power floor is also estimated it follows that an estimate of the neighbor cell interference can be made available before FDE processing. Note that the solution in [2] requires that a RAKE receiver for each user is used as well, in order to obtain a measure of all own cell user powers.

1.16.4 Computation of the Denominator of (F2)

The computation of the denominator of (F2) is performed as in Annex E.

1.16.5 Load Estimate

Combining (E4), (F2) and (F3) results in $$NF_u^{FDE}(t)=\frac{z_{FDE,u}^H(t)z_{FDE,u}(t)-\left(\sum_{l=0}^{L-1}w_u^H(l)w_u(l)\right)\hat{I}^{neighbot}(t)}{\left(\sum_{l=0}^{L-1}w_u^H(l)w_u(l)\right)\left(\sum_{a=1}^{A}\hat{N}_a^{thermal}\right)} \quad (F4)$$

$$=\frac{z_{FDE,u}^H(t)z_{FDE,u}(t)}{\left(\sum_{l=0}^{L-1}w_u^H(l)w_u(l)\right)\left(\sum_{a=1}^{A}\hat{N}_a^{thermal}\right)}-\frac{\hat{I}^{neighbot}(t)}{\left(\sum_{a=1}^{A}\hat{N}_a^{thermal}\right)}.$$

The quantities above should be computed as averages or estimates over a time interval where the equalizing filter of the FDE remains constant. The result is intuitive. Since the total received wideband power is summed over all antenna branches, so is the thermal noise power floor. The RoT after FDE is also scaled with the power of the equalizing filter.

1.16.6 Combination of Users

The above discussion has focused on a single user. However, what is interesting is a load measure for the complete uplink. Since it is likely that it is the user that experiences the highest load that limits the uplink, the uplink load relevant for stability is defined to be $$NF^{FDE}=\max_u NF_u^{FDE}, \quad (23)$$

where $NF_u^{FDE}$ is the noise rise of user k.

What is claimed is:

1. A method of monitoring power control loop stability implemented by a base station serving in a cell of a wireless communication network, the method comprising:
   receiving signals from one or more user terminals;
   suppressing interference in the received signals with an interference suppression receiver to obtain reduced interference signals;
   estimating neighbor cell interference from neighboring cells;
   computing a noise rise estimate as a function of the reduced interference signals and the estimate of the neighbor cell interference; and
   determining power control loop stability based on the noise rise estimate.

2. The method of claim 1, wherein the estimating of neighbor cell interference comprises:
   measuring total wideband received power at the base station;
   estimating thermal noise at the base station as a function of the total wideband received power;
   determining a cell load factor indicating a current load at the base station before interference suppression;
   estimating a sum of neighbor cell interface and thermal noise as a function of the total wideband received power and the cell load factor; and
   subtracting the estimate of the thermal noise from the estimate of the sum of neighbor cell interference and thermal noise to obtain an estimate of the neighbor cell interference.

3. The method of claim 2, wherein estimating a sum of neighbor cell interference and thermal noise comprises computing the sum of neighbor cell interference and thermal noise with a Kalman filter, where the total wideband received power and cell load factor are inputs to the Kalman filter and a state of the Kalman filter equals the sum of neighbor cell interference and thermal noise.

4. The method of claim 1, wherein computing a noise rise estimate comprises:
   computing a noise rise estimate for individual user terminals transmitting on an uplink channel; and
   selecting a maximum noise rise estimate for the individual user terminals as the noise rise estimate for the base station.

5. The method of claim 4, wherein the interference suppression receiver comprises a GRAKE receiver or chip equalizer receiver, and wherein computing a noise rise estimate for an individual user terminal comprises:
   estimating a signal-to-interference ratio for the individual user terminal based on the reduced interference signals; and
   computing the noise rise estimate as a function of the signal-to-interference ratio and the neighbor cell interference.

6. The method of claim 4, wherein the interference suppression receiver comprises a frequency domain equalization receiver or frequency domain pre-equalization receiver having a frequency domain equalization filter, and wherein computing a noise rise for an individual user terminal comprises:
- computing rise-over-thermal for the user terminal as a function of a pre-equalized wideband signal output from said equalization filter, filter coefficients for the equalization filter, and thermal noise; and
- subtracting the neighbor cell interference divided by the thermal noise from the rise-over-thermal.

7. The method of claim 1, wherein determining stability of the power control loop based on the noise rise comprises comparing a first function indicative of a magnitude of a noise rise to a first threshold.

8. The method of claim 7, wherein determining stability of the power control loop based on the noise rise comprises comparing a second function indicative of a rate of change of the noise rise to a second threshold.

9. The method of claim 8, further comprising interrupting a power control loop to prevent a power rush when one of said first or second functions of the noise rise exceeds a corresponding one of said first or second thresholds.

10. The method of claim 9, further comprising sending power down commands to one or more user terminals to reduce an uplink load.

11. A base station for a cell of a communication network, said base station comprising:
- an interference suppression receiver to suppress interference in signals received at the base station from one or more user terminals to obtain one or more interference suppressed signals; and
- a control circuit to control transmit powers of the user terminals, said control circuit comprising:
  - a neighbor cell interference estimation circuit to generate an estimate of interference from neighboring cells;
  - a noise rise estimation circuit to compute a noise rise for the user terminals as a function of the interference suppressed signals and the estimate of the neighbor cell interference; and
  - a stability monitoring circuit to monitor a stability of a power control loop for the user terminals based on the noise rise.

12. The base station of claim 11, further comprising:
- a power measurement circuit to measure total wideband received power in the cell;
- a thermal noise estimation circuit to estimate thermal noise in the cell as a function of the total wideband received power; and
- a cell load estimation circuit to estimate a cell load factor indicative of an own cell load.

13. The base station of claim 12, wherein the neighbor cell interference estimation circuit comprises:
- an interference estimation circuit to estimate a sum of the neighbor cell interference and thermal noise as a function of the total wideband received power and the cell load factor; and
- a summing circuit to subtract the estimate of the thermal noise from the estimate of the sum of neighbor cell interference and thermal noise to obtain an estimate of neighbor cell inference.

14. The base station of claim 13, wherein the interference estimation circuit comprises a Kalman filter, wherein the total wideband received power and cell load factor are inputs to the Kalman filter, and wherein a state of the Kalman filter equals the sum of neighbor cell interference and thermal noise.

15. The base station of claim 11, wherein the noise rise estimation circuit is configured to:
- compute a noise rise estimate for individual user terminals transmitting on an uplink channel; and
- select a maximum noise rise estimate for the individual user terminals as a noise rise estimate for the base station.

16. The radio base station of claim 15, wherein the interference suppression receiver comprises a GRAKE receiver or chip equalizer receiver.

17. The base station of claim 14, wherein the noise rise estimation circuit is configured to compute the noise rise estimate for an individual user terminal by:
- estimating a signal-to-interference ratio of a reduced interference signal for the user terminal; and
- computing the noise rise estimate for the user terminal as a function of the signal-to-interference ratio and the neighbor cell interference.

18. The base station of claim 15, wherein the interference suppression receiver comprises a frequency domain equalization receiver or a frequency domain pre-equalization receiver having a frequency domain equalization filter.

19. The base station of claim 18, wherein the noise rise estimation circuit is configured to compute the noise rise by:
- computing rise-over-thermal as a function of a pre-equalized wideband signal output from said equalization filter, filter coefficients for the equalization filter, and thermal noise; and
- subtracting the neighbor cell interference divided by the thermal noise from the rise-over-thermal.

20. The base station of claim 11, wherein the stability monitoring circuit is configured to compare a first function indicative of a magnitude of a noise rise to a first threshold.

21. The base station of claim 20, wherein the stability monitoring circuit is configured to compare a second function indicative of a rate of change of the noise rise to a second threshold.

22. The base station of claim 21, wherein the stability monitoring circuit is configured to interrupt a power control loop to prevent a power rush when one of said first and second functions exceeds a corresponding one of the first or second thresholds.

23. The base station of claim 22, wherein the stability monitoring circuit is configured to send power down commands to one or more user terminals to reduce an uplink load.

* * * * *